(12) United States Patent
Griffin et al.

(10) Patent No.: US 11,865,655 B2
(45) Date of Patent: Jan. 9, 2024

(54) TECHNIQUES FOR AUTOMATED MAINTENANCE OF INTEGRALLY BLADED ROTORS

(71) Applicant: BLADE DIAGNOSTICS CORPORATION, Pittsburgh, PA (US)

(72) Inventors: Jerry H. Griffin, Dunedin, FL (US); Drew M. Feiner, Pittsburgh, PA (US); Blair E. Echols, Pittsburgh, PA (US); Michael J. Cushman, Pittsburgh, PA (US); Alex J. Kowalski, Pittsburgh, PA (US); Daniel J. Ryan, Oviedo, FL (US)

(73) Assignee: Blade Diagnostics Corporation, Pittsburgh, PA (US)

( * ) Notice: Subject to any disclaimer, the term of this patent is extended or adjusted under 35 U.S.C. 154(b) by 0 days.

(21) Appl. No.: 17/753,047

(22) PCT Filed: Jan. 20, 2021

(86) PCT No.: PCT/US2021/014143
§ 371 (c)(1),
(2) Date: Feb. 16, 2022

(87) PCT Pub. No.: WO2021/150579
PCT Pub. Date: Jul. 29, 2021

(65) Prior Publication Data
US 2022/0266399 A1  Aug. 25, 2022

Related U.S. Application Data

(60) Provisional application No. 62/963,419, filed on Jan. 20, 2020.

(51) Int. Cl.
*B23P 6/00* (2006.01)
*B24B 1/00* (2006.01)
*F01D 5/10* (2006.01)

(52) U.S. Cl.
CPC ............ *B23P 6/002* (2013.01); *B24B 1/00* (2013.01); *F01D 5/10* (2013.01); *F05D 2230/72* (2013.01);
(Continued)

(58) Field of Classification Search
CPC .. B23P 6/002; F05D 2230/72; F05D 2230/80; F05D 2260/83
See application file for complete search history.

(56) References Cited

U.S. PATENT DOCUMENTS 6,339,878 B1  1/2002  Owen et al.
2006/0236765 A1  10/2006  Bquet et al.
(Continued)

FOREIGN PATENT DOCUMENTS

WO   2019209410 A1   10/2019
WO   WO-2019209410 A1 * 10/2019 ............ G01M 7/025

OTHER PUBLICATIONS

Vargui et al., A reduced order model based on sector mistuning for the dynamic analysis of mistuned bladed disks. Jun. 7, 2021, pp. 1-16.
(Continued)

*Primary Examiner* — Kyle A Cook
(74) *Attorney, Agent, or Firm* — Wolter Van Dyke Davis, PLLC; Eugene J. Molinelli

(57) ABSTRACT

A method and apparatus for maintaining integrally bladed rotors (IBR) includes using first vibration data from a IBR vibration apparatus of a first IBR to determine a set of values for a corresponding set of inherent vibratory properties based on a reduced order model for an IBR type to which the first IBR belongs. Shape data indicating an initial shape of a surface of a first blade is used, with repair data that indicates a candidate repair to form a restored shape, to determine a change in a value of an inherent blade section (Continued)

vibratory property of the set of inherent vibratory properties. A condition of the first IBR is determined based at least in part on the change in the value of the inherent blade section vibratory property. The first IBR is maintained based on the condition.

24 Claims, 17 Drawing Sheets

(52) U.S. Cl.
CPC ...... *F05D 2230/80* (2013.01); *F05D 2260/83* (2013.01)

(56) References Cited

U.S. PATENT DOCUMENTS

| | | |
|---|---|---|
| 2007/0083338 A1 | 4/2007 | Griffin et al. |
| 2013/0170947 A1* | 7/2013 | Kurt-Elli ................. F01D 25/06 415/13 |
| 2014/0030092 A1* | 1/2014 | Heinig ..................... F02C 9/00 416/61 |
| 2016/0258443 A1 | 9/2016 | Guglielmin et al. |
| 2017/0211391 A1* | 7/2017 | Wygant ..................... F01D 5/26 |
| 2017/0370220 A1* | 12/2017 | Morris .................... B23P 6/002 |
| 2020/0102827 A1* | 4/2020 | Morris .................... G06F 30/23 |
| 2020/0182731 A1* | 6/2020 | Pickens .................. F01D 5/027 |
| 2022/0100919 A1* | 3/2022 | Chakrabarti ............ G06F 30/28 |

OTHER PUBLICATIONS

International Search Report and Written Opinion for International Patent Application No. PCT/US21/14143 dated Apr. 2, 2021, pp. 1-17.

* cited by examiner

TECHNIQUES FOR AUTOMATED MAINTENANCE OF INTEGRALLY BLADED ROTORS

CROSS-REFERENCE TO RELATED APPLICATIONS

This application claims benefit under 35 U.S.C. § 119(e) of Provisional Appln. 62/963,419, filed Jan. 20, 2020, the entire contents of which are hereby incorporated by reference as if fully set forth herein.

BACKGROUND OF THE INVENTION

Integrally bladed disks (IBDs) are a relatively recent development in gas turbine engine technology. IBDs are bladed disks in which the blades and disk (or hub) form one continuous structure. The blades may be welded to the disk or formed integrally with the disk by being milled from a single block of material. IBDs are also referred to in the aerospace industry as blisks or as integrally bladed rotors (IBRs). While IBRs are becoming more popular in gas turbine aero engines, earlier traditional aero engine designs as well as many current industrial turbine and compressor designs have individual blades that are held in place by inserting them into slots in the disk.

Turbine blades on an IBR are part of a dynamic system with a complex vibratory response. For example, consider the difference in the vibratory response of a single turbine blade in isolation and a set of turbine blades mounted to a disk. A single turbine blade in isolation has mode shapes such as first bending and first torsion that generally have broadly spaced natural frequencies, resulting in a relatively simple vibratory response. However, when a set of turbine blades are mounted on a disk, they interact with each other producing large numbers of modes with closely spaced frequencies and more complex dynamics A disk with N blades will have N modes with similar frequency in which the airfoils deflect in a first bending shape, and N modes with similar frequency in which the airfoils deflect in a first torsion shape. These sets of modes with similar airfoil deflection patterns are referred to as mode families.

Ideally, all of the blades on a single disk are identical to each other, but this is not the case in reality. When it comes to vibration, no two IBRs are alike. Every IBR has a unique set of properties that may cause it to vibrate differently from other bladed disks, even those of the same design. Differences in individual blades due to manufacturing tolerances, wear, damage or repairs will cause them to vibrate at different frequencies. This phenomenon of blades having different frequencies from each other is called mistuning. Because of mistuning and the associated complex vibrational behavior, some blades of an IBR can vibrate strongly while others are vibrating much more gently. Blades with a higher vibratory response are more susceptible to high cycle fatigue damage, and because mechanical failure of a bladed disk is such a catastrophic event, there has been a long felt need by operators of turbine engines to be able to predict, and thereby to prevent by maintenance activities, vibration-induced damage and associated failures.

Foreign objects that come into contact with an IBR during operation can change the configuration of one or more blades by twisting, denting, displacing or removing material, or some combination, on one or more blades. It has been observed that damage rates on expensive IBR blades can often be higher than expected, which severely impacts sustainment costs and fleet readiness. Blending is a simple repair technique that smooths out torn material, however, blending changes the vibrational characteristics of an IBR. Due to fears that excessive blending can cause unanticipated vibrations and expanding damage during operation, conservative, simple blend limits are established for all IBRs of a particular design.

SUMMARY OF THE INVENTION

In structural mechanics, a reduced order model is a simplified approach to modeling the vibratory response of a structure using a smaller number of degrees of freedom than a standard model, such as a finite element model (FEM), used for design of the structure. The number of degrees of freedom in a formulation is the number of parameters needed to describe its physical state. It is here recognized that reduced order modeling, which is capable of characterizing IBR dynamic response independently of environmental conditions (i.e. capable of identifying the IBD's inherent vibration properties or its vibratory DNA), can also be used to simulate the effects of blending or other repairs on a damaged blade. For example, inherent vibration properties of an IBR can be expressed by a nodal diameter plot or blade frequency ratios of an IBR in one or more families of vibration modes, or other environmentally invariant properties, or some combination. These parameters can be determined by analyzing vibration data from the IBR using known calculational techniques, known environmental forcing factors, and a reduced order model, such as the Fundamental Mistuning Model (FMM) described in U.S. Pat. No. 7,082,371. Reduced order models are many times more efficient to use in computations than a finite element model (FEM). For example, FMM, which is based on a simple theory for predicting mistuning response, is thousands of times faster than an FEM.

Techniques are provided for automated maintenance (e.g., monitoring or repairing or both) of an IBR based on measurements of a shape of a blade of the IBR and such reduced order modeling, e.g., within a fleet of vehicles using turbine engines, or within a set of one or more facilities using turbine generators.

In a first set of embodiments, a method includes operating a IBR vibration apparatus to accumulate first vibration data of a first IBR to be tested and determining a set of values for a corresponding set of inherent vibratory properties of the first IBR based on the vibration data and a reduced order model for an IBR type to which the first IBR belongs. The method also includes operating an optical scanner to measure an initial shape of at least one surface of a first blade of the first IBR. The method further includes obtaining repair data that indicates a candidate repair to form a restored shape of the at least one surface of the first blade. Yet further, the method includes predicting automatically on a processor a change in a value of an inherent blade section vibratory property of the set of inherent vibratory properties of the first IBR based on the restored shape. Still further, the method includes determining automatically on the processor a condition of the first IBR based at least in part on the change in the value of the inherent blade section vibratory property. Again further, the method includes presenting, on a display device, the condition.

In some embodiments of the first set, the repair data indicates a shape of a jig for a blending apparatus. In some embodiments of the first set, the method also includes operating a blending apparatus configured to blend the first blade based on a candidate blend associated with an approved blend value for the condition. In some of these latter embodiments, the repair data indicates a shape of a jig for the blending apparatus and the method further includes automatically operating the blending apparatus to use the jig to form the restored shape of the at least one surface of the first blade.

In various embodiments of the first set, the inherent blade section property is blade frequency ratio; or, predicting the change in the value of an inherent blade section vibratory property further comprises using a single blade section finite element model; or, the reduced order model is a Fundamental Mistuning Model (FMM); or, some combination.

In some embodiments of the first set, the method also includes determining a predicted performance of the first IBR based at least in part on the change in the value of the inherent blade section vibratory property and the reduced order model for the IBR type. In these embodiments, determining the condition includes determining the condition based at least in part on the predicted performance.

In some embodiments of the first set, the method also includes determining a dynamic stress amplification factor (DSAF) based at least in part on the first vibration data; and, determining the condition includes determining the condition based at least in part on the DSAF.

In some embodiments of the first set, the repair data indicates: one or more coupons for predetermined repairs; or one or more repair operations manually input through a graphical user interface by an operator; or some combination.

In a second set of embodiments, a method for maintaining integrally bladed rotors (IBR) includes more severe repairs than previously allowed. The method includes receiving automatically on a processor first vibration data from a IBR vibration apparatus of a first IBR to be tested and determining a set of values for a corresponding set of inherent vibratory properties of the first IBR based on the vibration data and a reduced order model for an IBR type to which the first IBR belongs. The method also includes receiving automatically on a processor shape data indicating an initial shape of at least one edge or surface of a first blade of the first IBR. Furthermore, the method includes receiving repair data that indicates a set of one or more pre-approved repairs for repairing a IBR and a candidate repair to form a restored shape of the at least one edge or surface of the first blade. The candidate repair is different from any repair in the set of pre-approved repairs and more severe than at least one repair in the set of pre-approved repairs. Still further, the method includes predicting automatically on a processor a change in a value of an inherent blade section vibratory property of the set of inherent vibratory properties of the first IBR based on the restored shape from the candidate repair. Yet further, the method includes determining automatically on a processor an acceptable condition for the first IBR based at least in part on the change in the value of the inherent blade section vibratory property. Even further still, the method includes presenting automatically on a display device the candidate repair and the approved condition. In some embodiments of the second set, each repair includes a blend.

In a third set of embodiments, a system for maintaining integrally bladed rotors (IBR), includes: a IBR vibration testing apparatus; an optical scanner; a display device; at least one processor; and at least one memory. The memory includes one or more sequences of instructions; and the at least one memory and the one or more sequences of instructions are configured to, with the at least one processor, cause the system to perform at least some of the steps of one or more of the above methods.

In other sets of embodiments, a computer apparatus or non-volatile computer readable medium is configured to perform one or more steps of one or more of the above methods.

Still other aspects, features, and advantages of the invention are readily apparent from the following detailed description, simply by illustrating a number of particular embodiments and implementations. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

A method and apparatus are described for maintaining one or more IBRs. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of a Fundamental Mistuning Model (FMM [1]) with specific inherent vibratory properties as parameters. However, the invention is not limited to this context. In the FMM model, the parameters that represent the inherent structural characteristics of an IBR are the tuned system frequencies, and the blade frequency ratios also known as mistuning values. The tuned system frequencies are the natural frequencies that the IBR would have if every blade were identical. The blade frequency ratios or mistuning values quantify the amount that each blade's frequency deviates from the average frequency of all blades on the IBR. For example, if a blade has a mistuning value of 1%, then its frequency is 1% above average for blades on that IBR.

The vibratory response of an IBR is also affected by environmental factors that are external to the IBR. Examples of environmental factors are the strength and distribution of excitation forces that cause the IBR to vibrate, as well as the amount of aerodynamic damping that resists its vibratory motion. Additional environmental factors are temperature and centrifugal forces that occur when an IBR rotates in an engine.

In other embodiments, other reduced order models with a different set of environmental and inherent parameters (also called structural parameters) may be used. Other examples of reduce order structural models used to represent IBRs instead of FMM include REDUCE, originally developed at the University of Michigan [2], and Subset of Nominal Modes developed at Carnegie Mellon University [3]. The latter, abbreviated SNM, is widely used by the gas turbine engine manufacturing community. It is called MDA (Modal Domain Approach) by one of the manufacturers.

1. Overview

Figure 1A:
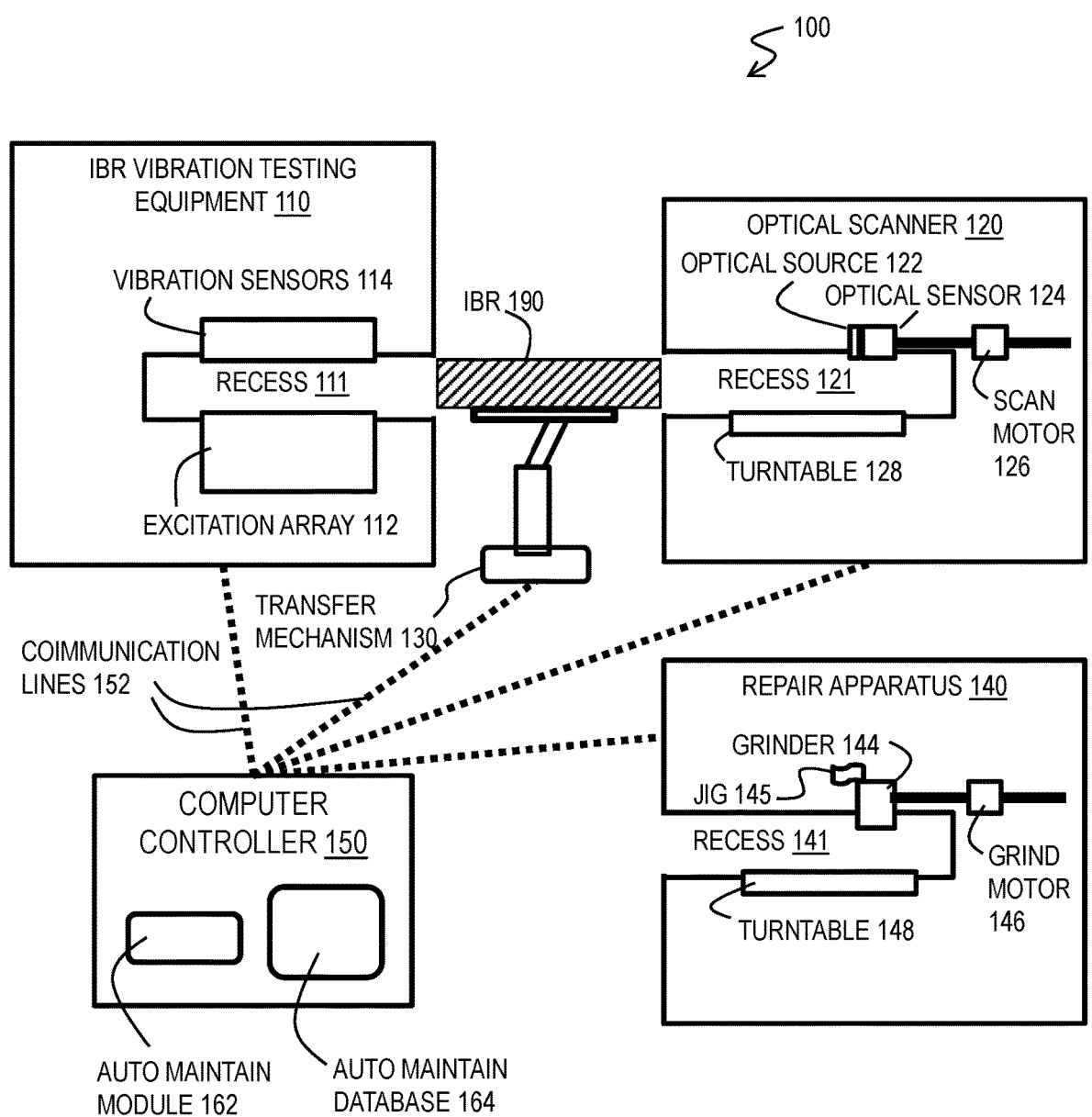
FIG. 1A is a block diagram that illustrates an example system for maintaining IBRs, according to an embodiment.
Figure 1B:
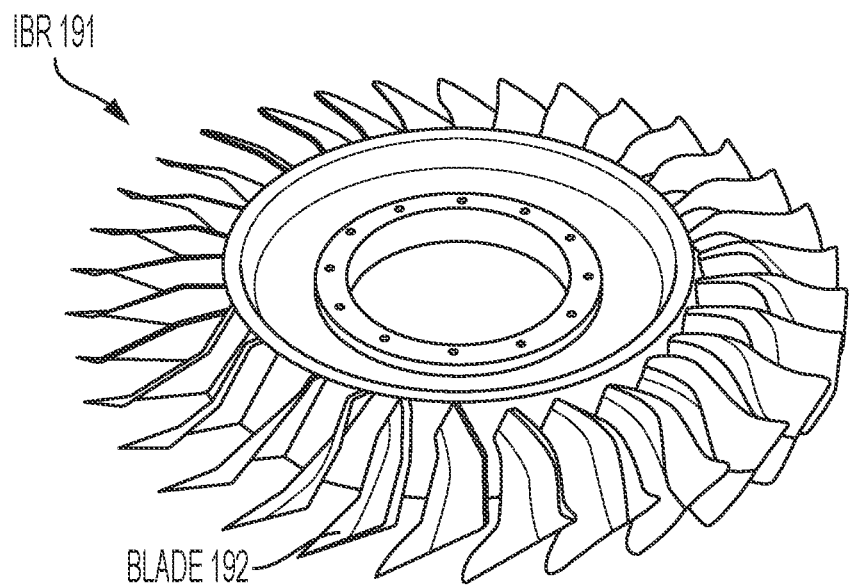
FIG. 1B is a perspective rendering of an example IBR that that can be used as a workpiece, according to an embodiment.

FIG. 1A is a block diagram that illustrates an example system 100 for maintaining IBRs, according to an embodiment. The system 100 includes IBR vibration testing equipment 110, an optical scanner 120, and a computer controller 150. In the illustrated embodiment, a repair apparatus 140 is also included, as is an optional automated transfer mechanism 130. Wired or wireless communication lines 152 transfer data and or control signals between the computer controller 150 and one or more of the other pieces of equipment. Also depicted in FIG. 1A is a workpiece IBR 190, but the workpiece IBR 190 is not part of system 100. FIG. 1B is a perspective rendering of an example IBR 191 that can be used as workpiece 190 according to an embodiment. IBR 191 includes 32 blades, such as blade 192.

Figure 1C:
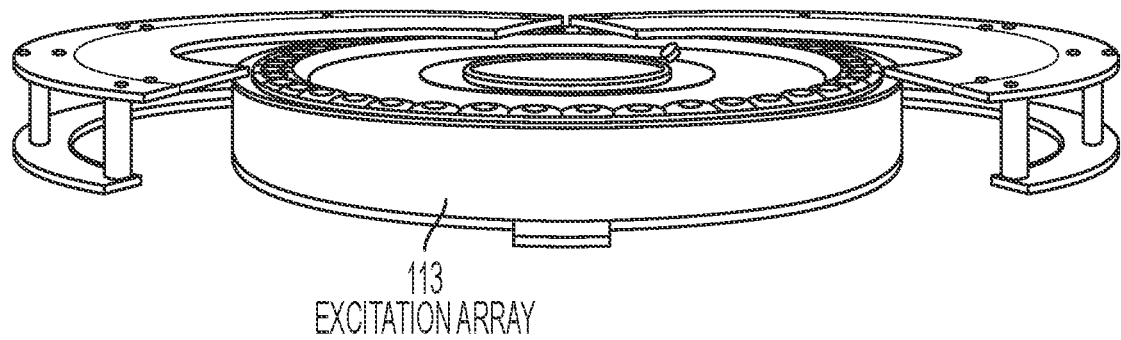
FIG. 1C is a perspective rendering of an example excitation array that can be used as a component of the system of FIG. 1A, according to an embodiment.

Referring again to FIG. 1A, the IBR vibration testing equipment 110 includes an excitation array 112 and a set of one or more vibration sensors 114. The IBR vibration testing equipment 110 also includes a recess configured to receive a workpiece, such as IBR 190. Such equipment 110 may be custom made or produced commercially. For example, the EzVibes® NDE (Non-Destructive Evaluation) system is available from Blade Diagnostics Corporation of Pittsburgh, Pennsylvania. The excitation array 112 is configured to produce conditions that excite a vibratory response in a workpiece, such as by using acoustic energy to simulate conditions expected to be encountered by the workpiece during operations, or other forcing conditions more suitable for a laboratory. FIG. 1C is a perspective rendering of an example excitation array 113 that can be used as component 112 of the system of FIG. 1A, according to an embodiment. In other embodiments, an excitation array 112 forces the workpiece with additional environmental properties, such as spatial and temporal variations in gas material, gas pressure, gas temperature and workpiece temperatures. Referring again to FIG. 1A, the one or more vibration sensors 114 are configured to detect the vibratory motion of the IBR as a function of time (motion could be deflection or its first or second time derivatives, velocity, or acceleration, respectively). Vibration sensors measure motion at multiple locations on the IBR. From this other properties can be derived, such as modal frequency, amplitude and location of vibrations within the workpiece using any methods or technologies. In some embodiments, control signals to operate the equipment 110 are received from local or remote computer controller 150 over one or more of communication lines 152. Data collected by equipment 110 is conveyed to the local or remote computer controller 150 over one or more of communication lines 152. In some embodiments, the vibration sensors 114 include one or more optical sources and an array of optical sensors, called herein an optical scanner (not shown). When the workpiece is not excited by the excitation array 112, such an optical scanner can be configured to provide a shape of an edge of each blade in the workpiece IBR 190. Blade edge data collected by optical scanner in vibration sensors 114 are conveyed to the local or remote computer controller 150 over one or more of communication lines 152.

In some embodiments, a separate optical scanner 120 is configured to detect reflection of a scanning laser beam from at least one surface (top or bottom or both) of each blade in the workpiece IBR 190. For example, the optical scanner 120 includes recess 121 configured to receive a workpiece, such as IBR 190. In the illustrated embodiment, the separate optical scanner 120 includes an optical source 122, such as stationary or scanning source of a laser beam, and an optical sensor 124, such as a charge coupled device (CCD) array. The source 122 and sensor 124 are configured to determine topography of one or more edges or one or more surfaces of a blade in a workpiece IBR 190. In some embodiments, a scan motor 126 is mechanically linked to the optical source 122 or the optical sensor 124, or both, to move the source 122 or sensor 124, or both, radially. In some embodiments, the optical scanner 120 includes a turntable with a separate motor (not shown) or mechanically linked with scan motor 126 to rotate the workpiece so that each blade can be rotated successively within the view of the optical source 122 and sensor 124. Any suitable custom or commercially available optical scanner may be used. For example a HandySCAN™ 3D optical scanner from CREAFORM™ USA of Irvine, California is used in some embodiments. In other embodiments, larger and more cumbersome systems can be used, such as ATOS™ series of industrial non-contact 3D scanners using structured blue light from GOM™ of Braunschweig, Germany. In some embodiments, control signals to operate the optical scanner 120 are received from local or remote computer controller 150 over one or more of communication lines 152. Blade edge or surface shape data collected by optical scanner 120 are conveyed to the local or remote computer controller 150 over one or more of communication lines 152.

The repair apparatus 140 is configured to repair at least a portion of any blade in the workpiece IBR 190. In some embodiments, the workpiece IBR 190 is blended manually by an operator. In some embodiments, the repair is some other repair that is done manually. In some embodiments, the workpiece IBR 190 is blended automatically under control of computer controller 150. For example, the repair apparatus 140 includes recess 141 configured to receive a workpiece, such as IBR 190. In the illustrated embodiment, the repair apparatus 140 includes a grinder 144 that is able to grind away material from a surface of a blade on the workpiece IBR 190 in a blending process. In some embodiments, the depth of grinding is controlled by a physical jig 145 that guides the grinding depth with radial distance, or its virtual equivalent. In some embodiments, a grind motor 146 is mechanically linked to the grinder 144, to engage the grinding mechanism or move the grinder 144 radially, or both. In some embodiments, the repair apparatus 140 includes a turntable with a separate motor (not shown) or mechanically linked with grind motor 146 to rotate the workpiece so that each blade can be rotated successively within the operational space of the grinder 144. Any suitable custom or commercially available blending apparatus may be used. For example, a multifunction CNC mill/grinder can be developed and used to remove material in some embodiments. Such a device that includes vision would blend the blade into an operation-worthy state.

In other embodiments, the repair apparatus 140 includes tools for other repairs, such as welding or other procedures to add material to the blade, or melting to move material along a blade, or replacing a blade, or some combination. In some embodiments, control signals to operate the repair apparatus 140 are received from local or remote computer controller 150 over one or more of communication lines 152. Data collected by repair apparatus 140 (such as initial and final vertical, and radial position of grinder 144, and grinding duration) is conveyed to the local or remote computer controller 150 over one or more of communication lines 152.

In some embodiments, the workpiece IBR 190 is transferred to or from each of one or more of the recesses 111, 121, 141 manually by an operator with or without a vehicle. In some embodiments, the workpiece IBR 190 is transferred to or from each of one or more of the recesses 111, 121, 141 automatically under control of computer controller 150 by an transfer mechanism 130, such as a conveyor belt or hard-wired or programmable robot. Any suitable transfer mechanism may be used. In some embodiments, control signals to operate the transfer mechanism 130 are received from local or remote computer controller 150 over one or more of communication lines 152. Data collected by transfer mechanism 130, such as state (loaded unloaded) or location or time stamp or some combination, are conveyed to the local or remote computer controller 150 over one or more of communication lines 152. In some embodiments, the transfer mechanism 130 is omitted and two or more recesses 111, 121 or 141 are shared for the devices 110 or 120 or 140.

Computer controller 150 is configured to send control signals to, and receive data back from, one or more of IBR vibration testing equipment 110, optical scanner 120, transfer mechanism 130, and repair apparatus 140. For example, processors and memory in one or more local or remote computer systems 800, or chip sets 900, described in more detail below with reference to FIG. 8 and FIG. 9, respectively, and collectively called hosts hereinafter, may serve as computer controller 150. The computer processors and memory are controlled by an automated maintenance module 162 which is configured to perform one or more of the maintenance or repair methods described in more detail below with reference to FIG. 5. Data about the workpiece IBR 190 and other IBR in the pool of IBR to be maintained are kept in one or more automated maintenance databases 164 on one or more local or remote hosts.

Although processes, equipment, and data structures are depicted in FIG. 1A as integral blocks in a particular arrangement for purposes of illustration, in other embodiments one or more components or processes or data structures, or portions thereof, are arranged in a different manner, on the same or different equipment or hosts, in one or more databases, or are omitted, or one or more different equipment or processes or data structures are included on the same or different hosts.

Figure 2A:
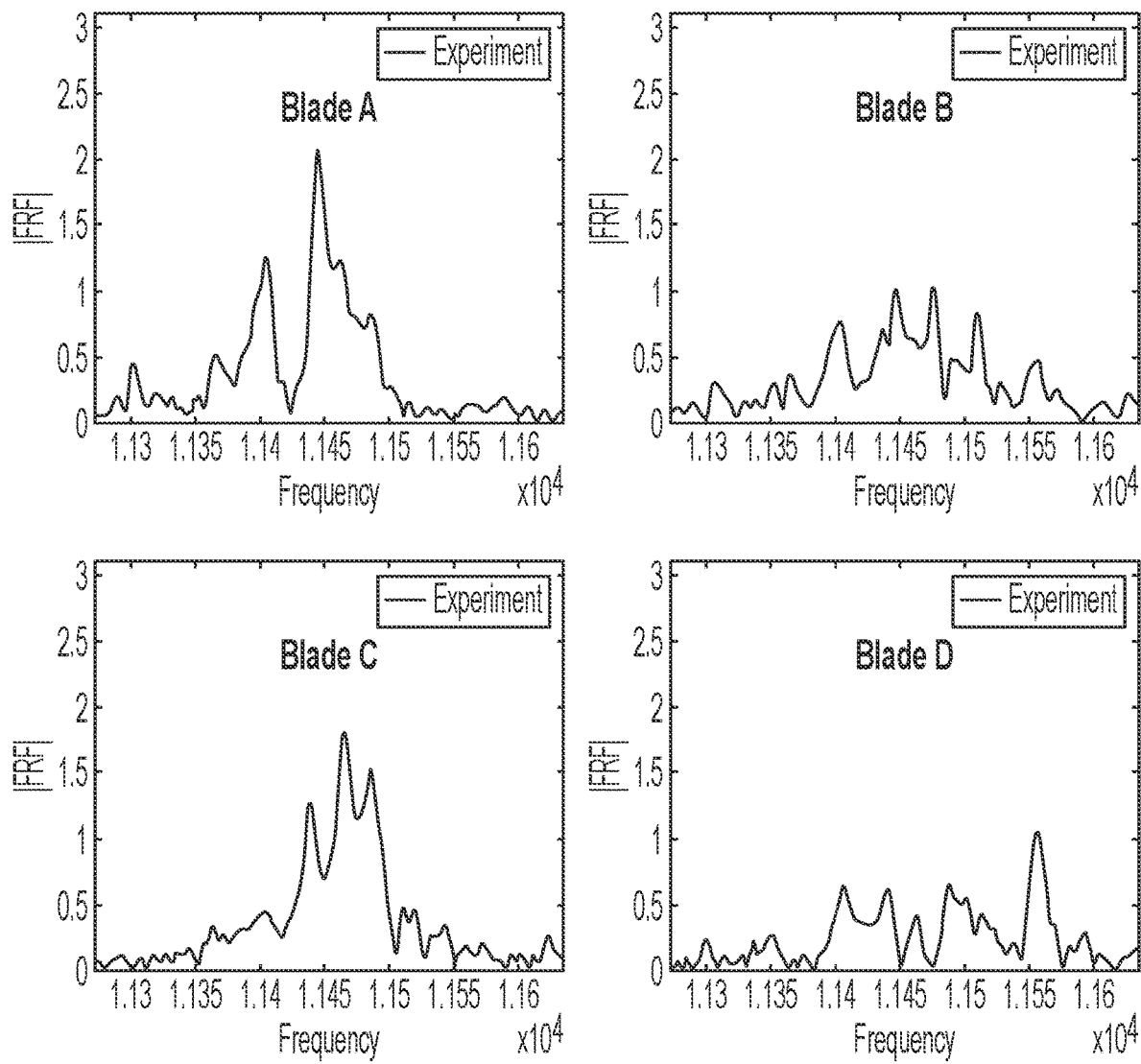
FIG. 2A are plots that illustrate example vibration data of an undamaged IBR, utilized according to an embodiment.

FIG. 2A are plots that illustrate examples of vibration data of an undamaged IBR, utilized according to an embodiment, for four blades identified as blades A through D, respectively, of a single IBR. These types of plot are commonly called frequency response functions or FRF. The horizontal axis indicates vibration frequency in hertz (Hz, 1 Hz=1 cycle per second); and the vertical axis indicates vibration amplitude, such as an amplitudes indicative of frequency response. The frequency response function given by each trace is the Fourier transform of the time domain response of a structure divided by the Fourier transform of the time domain excitation input. It is important because it can be used to calculate the response of the structure for different time domain excitations. More fundamentally, it identifies the resonant frequencies at which the structure has high vibratory response that could cause the structure to fail from high cycle fatigue. In this example, each trace indicates the frequency response measured in IBR vibration testing equipment 110 for a separate blade of a single IBR, such as workpiece IBR 190.

As can be seen, each blade shows complex behavior with multiple peaks. If it were possible to test single blades each would have a single, distinct resonant peak in this frequency range. However, the core structure of the IBR couples the blades so that they vibrate in system modes involving the participation of multiple blades with slightly different frequencies that interact in a complex manner to form system modes. This is why the FRFs for the blades of an IBR depicted in FIG. 2A have multiple peaks instead of single peaks. The frequency range of the resonant peaks in FIG. 2A is fairly narrow, about 3%, and is representative of undamaged, newly manufactured IBRs. In an embodiment, the owner of the IBR imposes limits on the frequency range of the resonant peaks as well as the amount of variation in the heights of the resonant peaks that the IBR would experience if it were installed in an engine. This is done by using a reduced order structural model to extrapolate from an IBR's vibratory response in the IBR vibration test equipment 110 to its vibratory response in the engine under conditions different from the test conditions.

Figure 2B:
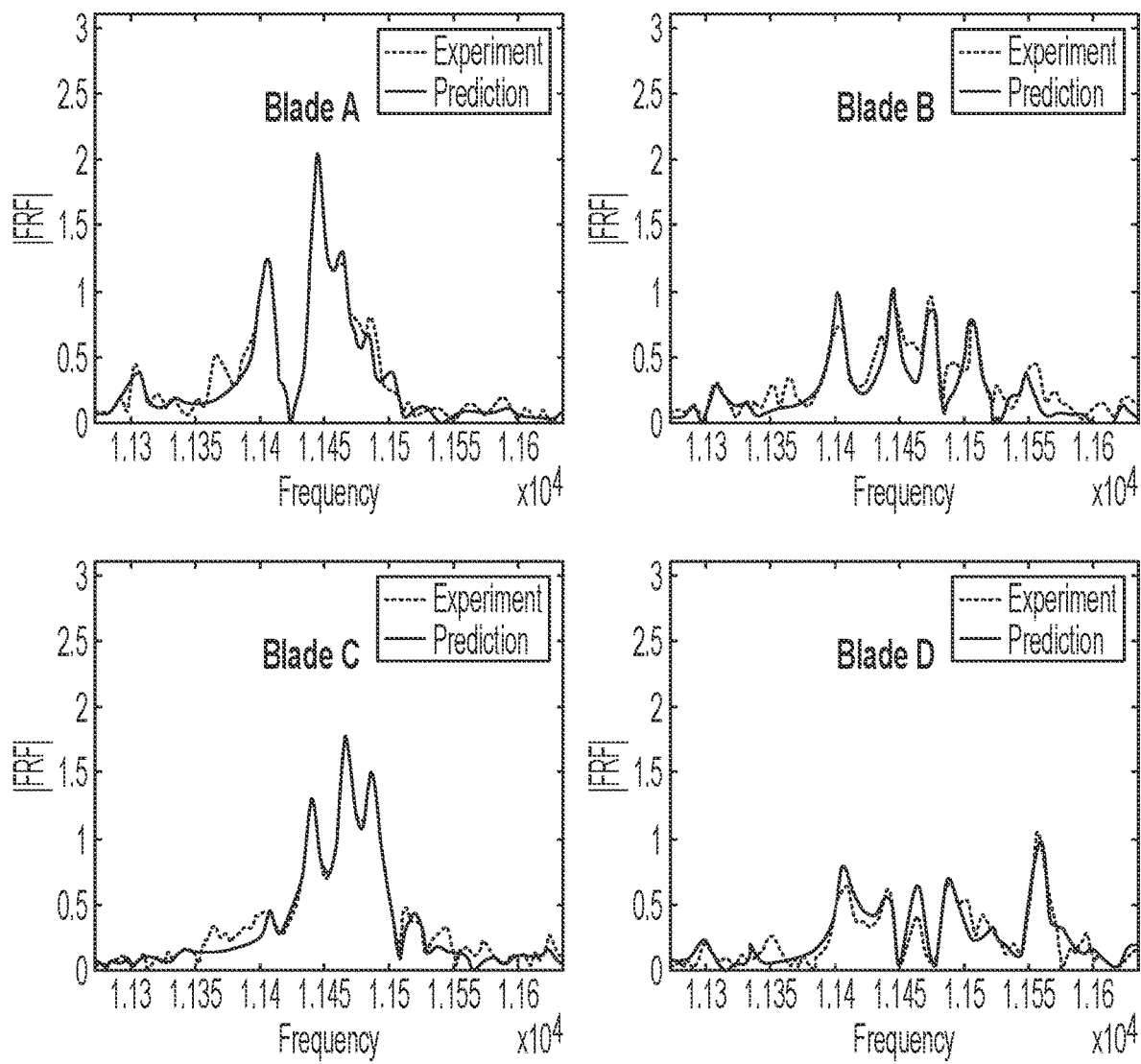
FIG. 2B are plots that illustrate examples of how well the prediction from a validated reduced order model match the vibration data for an undamaged IBR, utilized according to an embodiment.

FIG. 2B are plots that illustrate examples of how well the prediction from a validated reduced order model match the vibration data for an undamaged IBR, utilized according to an embodiment. FIG. 2B illustrates a comparison of experimental FRFs (lighter traces) of the blades of an IBR with the FRFs (heavy traces) of a reduced order structural model utilized according to an embodiment. The values for parameters representing the inherent vibratory properties are optimized to best fit the reduced order model to experimental FRFs. The comparison in FIG. 2B constitutes a validation of the reduced order model because the FRFs are nearly indistinguishable. The reduced order model has parameters that reflect the inherent structural properties of the IBR as well as environmental factors. After the model is validated and values for the inherent vibratory parameters set, then the values for the environmental parameters are modified to match engine conditions and the model used to predict the IBR's vibratory response in the engine.

The reduced order model that was used in this example is the Fundamental Mistuning Model or FMM. Other reduced order structural models of IBRs, for example, those used in REDUCE or SNM could also be used for this purpose. Environmental factors include the distribution and magnitude of forces that excite the IBR and the aerodynamic damping that reduces the vibratory responses. Two additional environment factors are temperature and the centrifugal forces that the IBR experiences when it rotates in the engine.

Figure 2C:
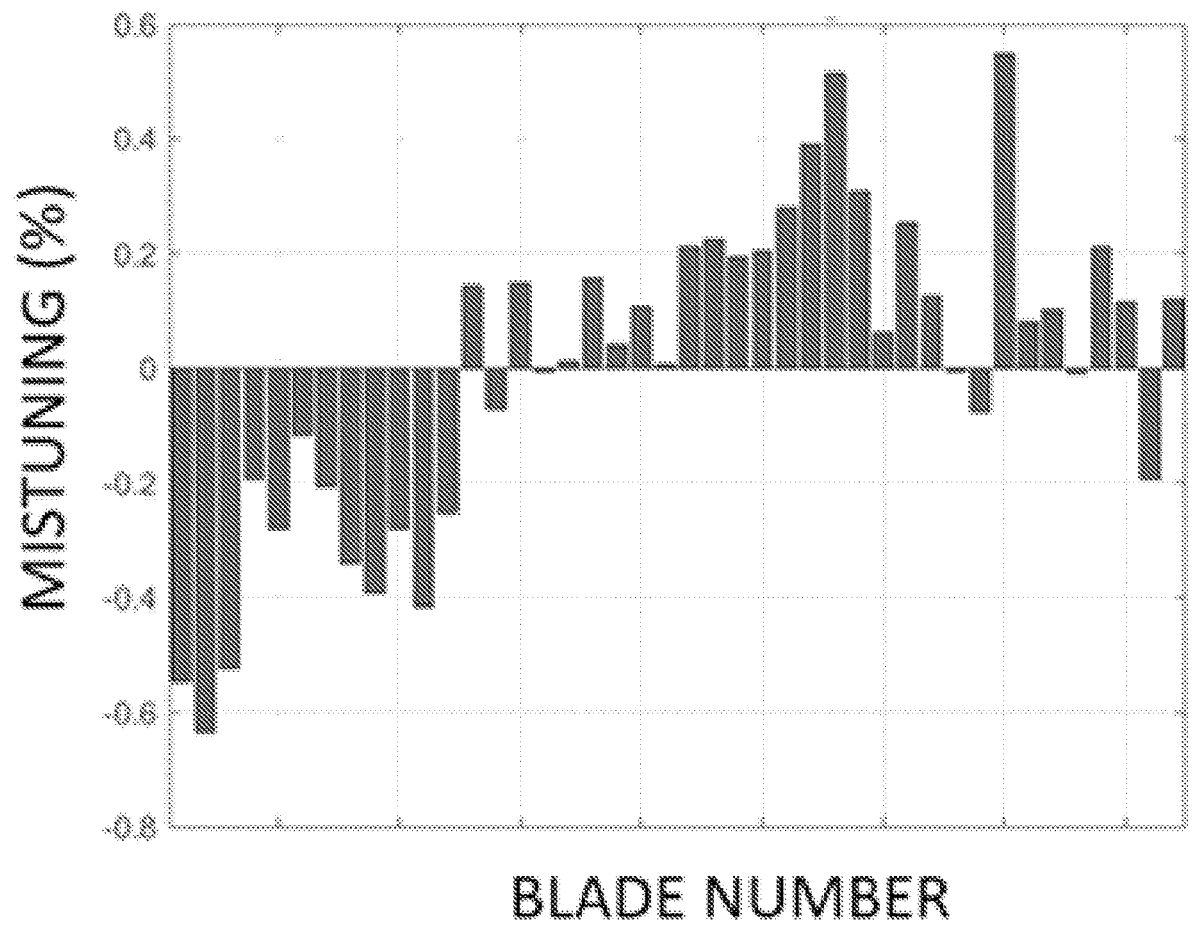
FIG. 2C is a plot that illustrates an example of the identified values of mistuning, an inherent property of the IBR, that is used in a reduced order model that best matches the vibration data for an undamaged IBR, utilized according to an embodiment.

FIG. 2C is a plot that illustrates an example of the identified values of mistuning, an inherent property of the IBR, that is used in the FMM reduced order model that best matches the vibration data for an undamaged IBR, utilized according to an embodiment. FIG. 2C depicts the mistuning in each blade as a function of blade number utilized according to an embodiment. Mistuning is one set of inherent vibratory properties (e.g., structural properties) used in FMM; and FIG. 2C represents the values of mistuning used in FMM to predict the FRFs plotted in FIG. 2B. Mistuning is defined as the deviation in the frequency of a blade from the average frequency of all blades on the IBR. It is usually expressed as a percentage. For example, from FIG. 2C, blade 1 has a frequency about 0.55% below average. In this example, the IBR under consideration had undamaged blades and the variations in the blade frequencies were relatively small, with a range of less than about 1.2%.

Figure 2D:
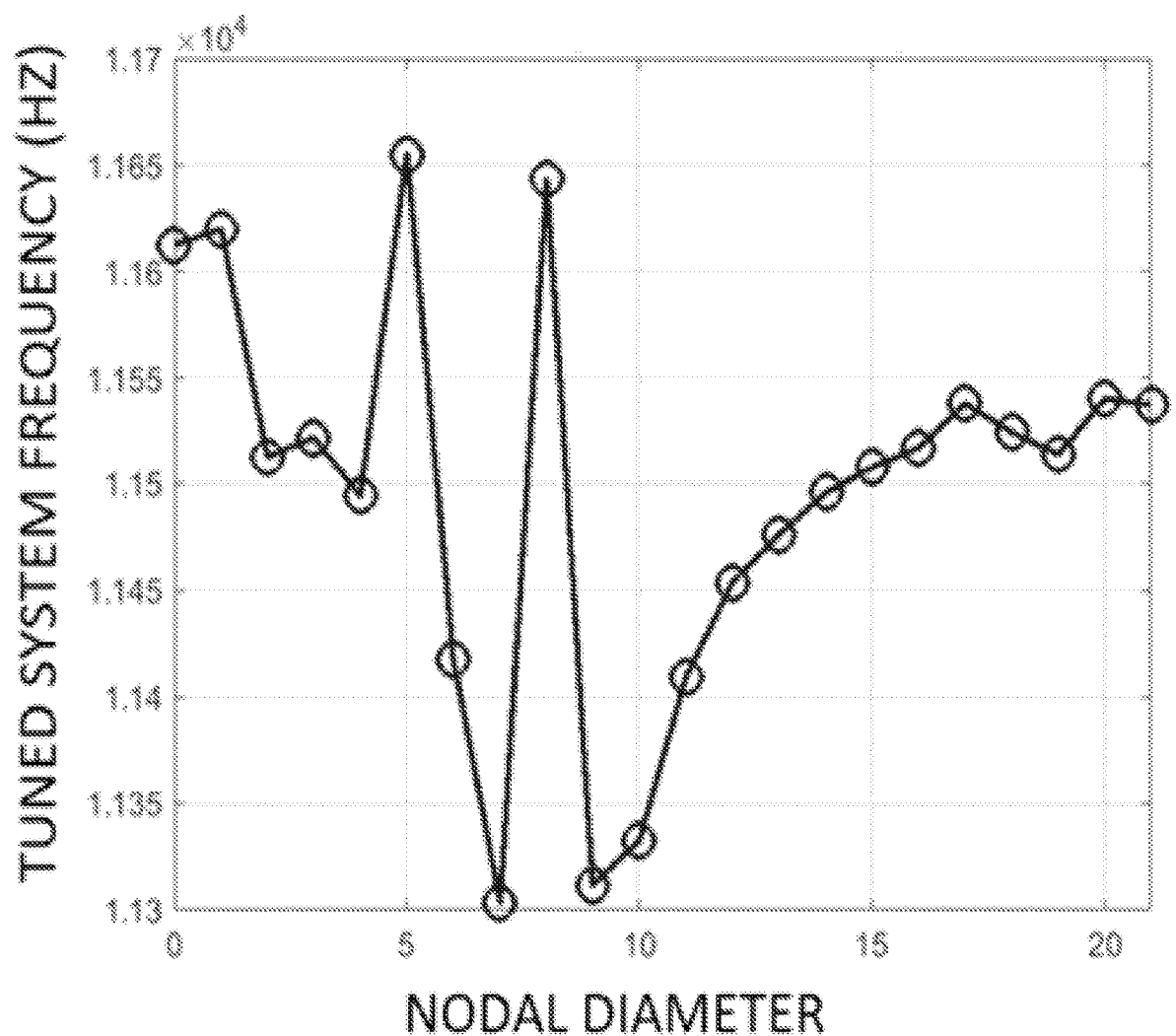
FIG. 2D is a plot that illustrates an example of the identified values of tuned system frequencies, a second inherent property of the IBR, used in a reduced order model that best matches the vibration data for an undamaged IBR, utilized according to an embodiment.

FIG. 2D is a plot that illustrates an example of the identified values of tuned system frequencies, a second inherent property of the IBR, used in a FMM reduced order model that best matches the vibration data for an undamaged IBR, utilized according to an embodiment. FIG. 2D depicts the tuned system frequencies of the IBR as a function of nodal diameter utilized according to an embodiment. Tuned system frequencies are the second set of inherent vibratory properties used in FMM; and FIG. 2D represents the values used in FMM to predict the FRFs plotted in FIG. 2B. The tuned system frequencies are the system frequencies that the IBR would vibrate at if there was no mistuning, i.e. if every blade on the IBR were tuned so that they had the same natural frequency. If an IBR were tuned and vibrated at a tuned system frequency, then the blades would vibrate with amplitudes that have a sinusoidal pattern with a distinctive nodal diameter.

When an IBR is marred during operation, it becomes a maintenance issue to determine if the IBR can still be used, or should undergo repair to remove and/or replace displaced material, or should be removed from operation. The removal of material is termed blending in the art. According to various embodiments, this determination is based, at least in part, on measured shape (also called geometry) of one or more blades on a workpiece IBR as well as on a change in the value of one or more inherent vibratory properties parameters due to a change in that shape.

Figure 2E:
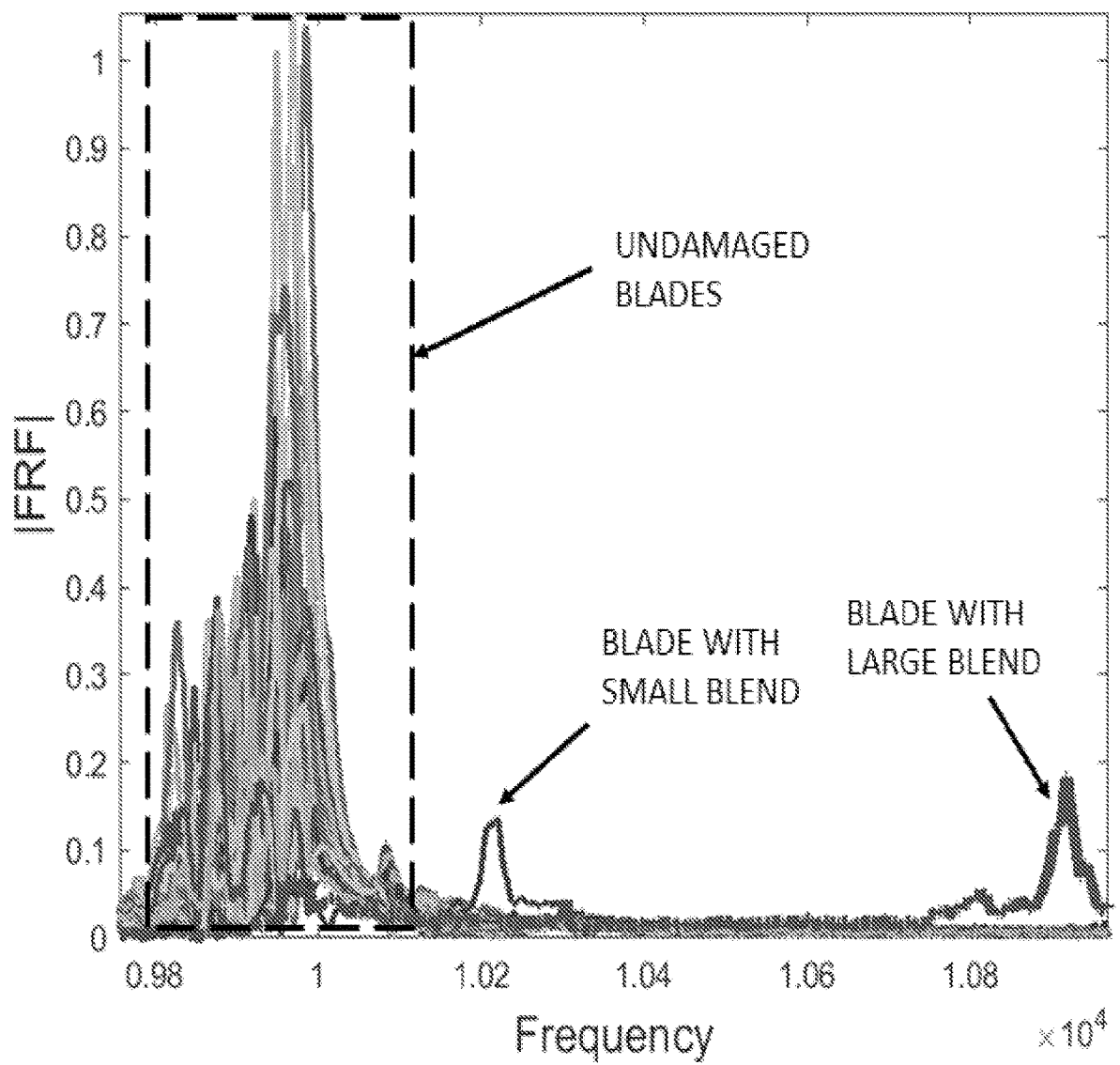
FIG. 2E is a plot that illustrates example vibration data of a damaged IBR that has been repaired using blending, utilized according to an embodiment.

FIG. 2E is a plot that illustrates example vibration data of a damaged IBR that has been repaired using blending, utilized according to an embodiment. FIG. 2E provides an illustration that depicts FRFs for a full set of blades of an IBR that has two of its blades blended. Again, the frequency peaks of the unblended blades occur in a relatively narrow range of about 3%. The peak amplitudes of the blade with a small blend and with a large blend lie outside this range and are clearly distinguishable. As a result, their vibratory behavior is of special concern.

Figure 2F:
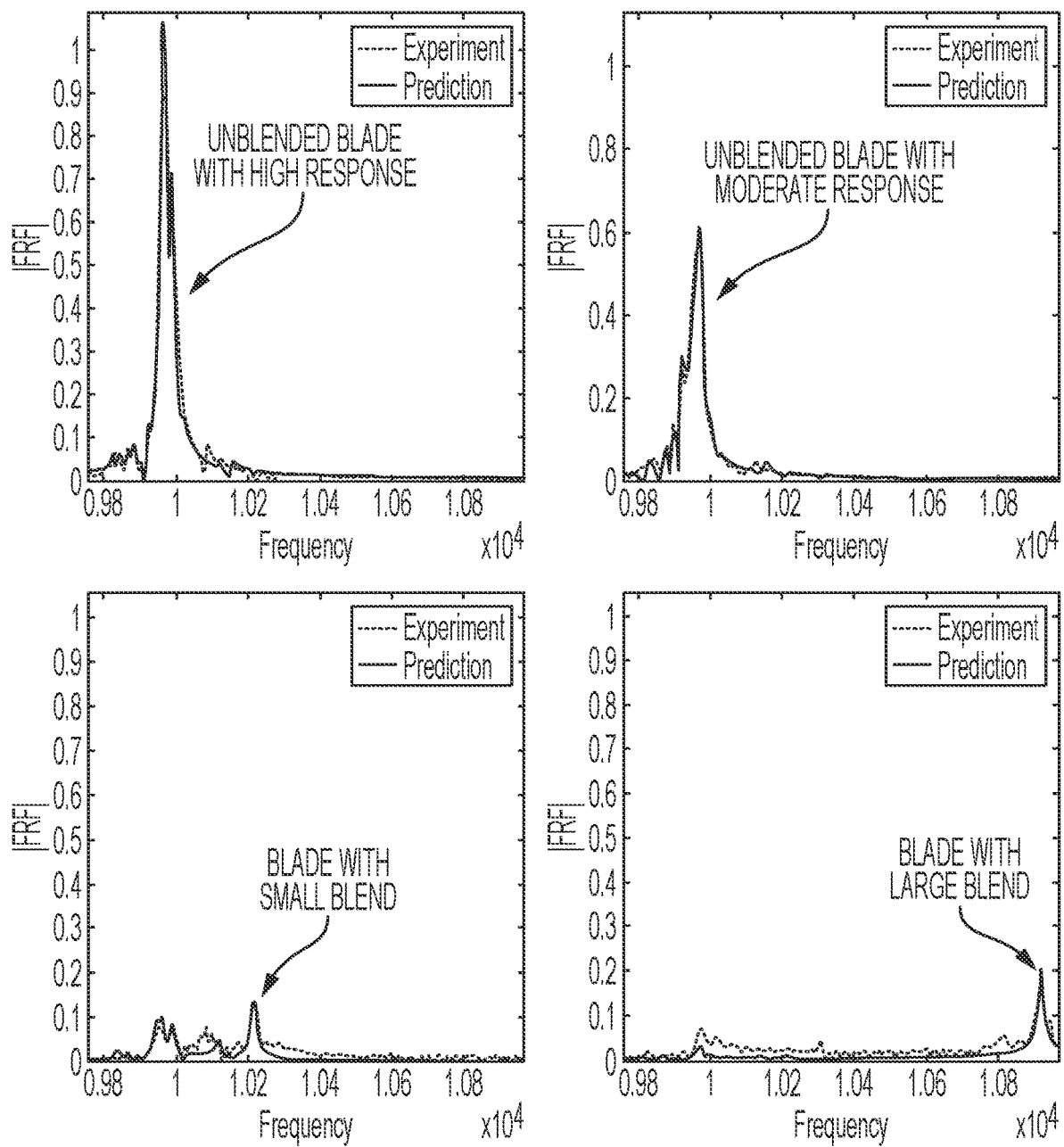
FIG. 2F are plots that illustrate examples of how well the predictions from a validated reduced order model match the vibration data for an IBR with two blended blades, utilized according to an embodiment.

FIG. 2F are plots that illustrate examples of how well the predictions from a validated reduced order model match the vibration data for an IBR with two blended blades, utilized according to an embodiment. FIG. 2F shows a comparison of four experimental FRFs from FIG. 2E (light traces) with the FRFs (dark traces) of a FMM model utilized according to an embodiment. The values of the model parameters were optimized to best fit the reduced order model to experimental FRFs. The experimental FRFs and the FRFs predicted by the FMM model are, again, nearly indistinguishable. It is clear that reduced order structural models can be used to represent the vibratory response and determine the properties of blended as well as unblended blades.

Figure 2G:
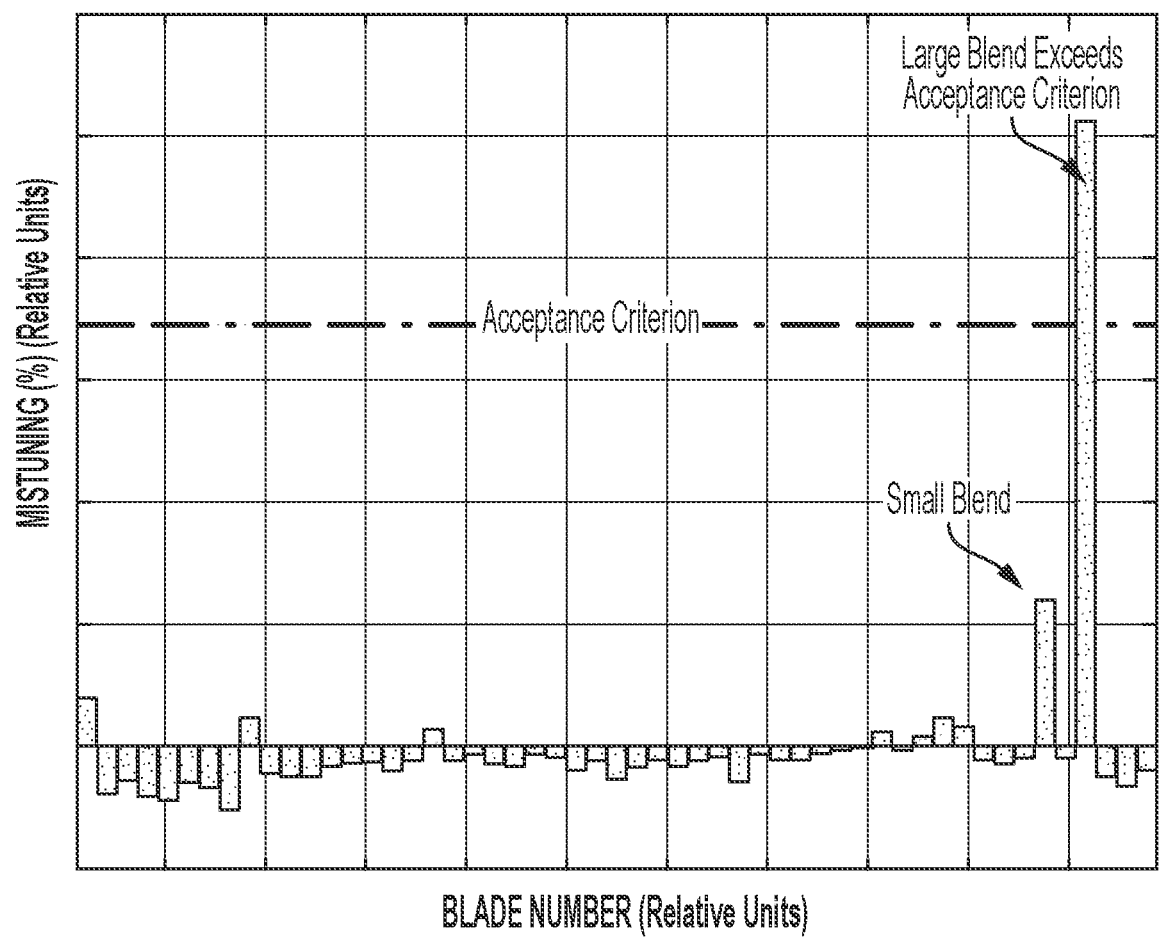
FIG. 2G is a plot that illustrates an example of the identified values of mistuning, an inherent property of the IBR, that are used in a reduced order model that best matches the vibration data for an IBR with two blended blades, utilized according to an embodiment.

FIG. 2G is a plot that illustrates an example of the identified values of mistuning, an inherent property of the IBR, that are used in a reduced order model that best matches the vibration data for an IBR with two blended blades, utilized according to an embodiment. FIG. 2G depicts a comparison of the mistuning identified for each blade of the blended IBR based on the FMM fit with an acceptance criterion, or threshold, utilized according to an embodiment. In this example, while the mistuning of the blade with the small blend is acceptable, the mistuning with the blade with the large blend exceeds the acceptance criterion. As a result, the blend repair would be unacceptable.

The vibration measurements obtained from the IBR vibration testing equipment 110, such as the measurements depicted in FIG. 2A, can be modeled with a finite element model by inputting detailed information about the material and dimensions of each blade and attached structures and about the environmental forcing functions imposed by the excitation array 112. However, for many uses, it is sufficient to be able to predict just the mistuning or location of maximum modal amplitudes. For this, a simplified reduced order model, such as the FMM, can be used.

Figure 3:
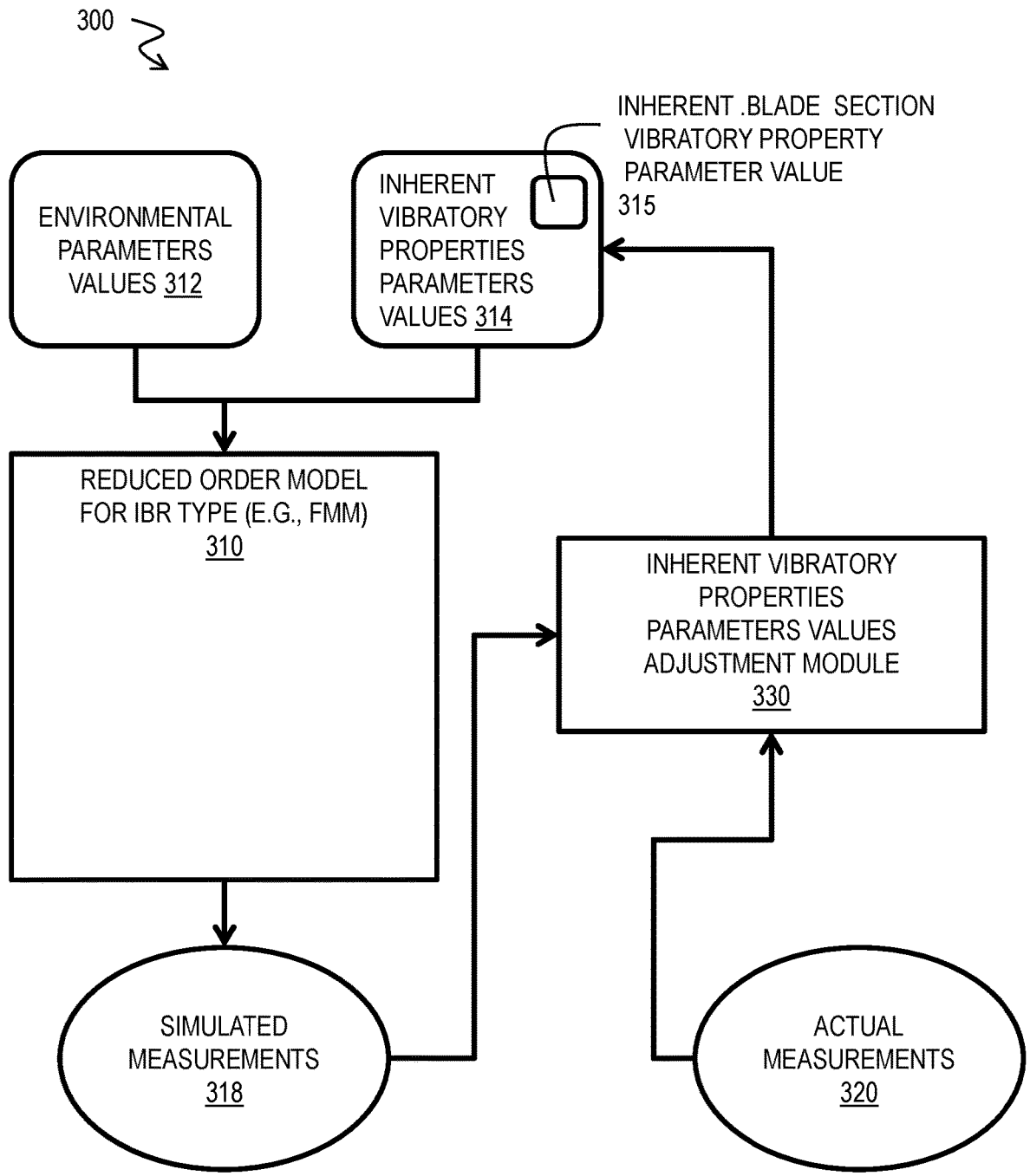
FIG. 3 is a block diagram that illustrates an example reduced order model for which parameter values are determined for inherent vibratory properties, utilized according to an embodiment.

FIG. 3 is a block diagram that illustrates an example reduced order model for which parameter values are determined for inherent vibratory properties, utilized according to an embodiment. FIG. 3 depicts the process for determining the values of inherent vibratory parameters for a reduced order model, such as described above for the FMM. The reduced order model 310 for a type of IBR (e.g., open or closed base or tip of individual blades and number of blades) can be generated with parameters for which different values can be input and a particular type of output that can be predicted or simulated. Some of the parameters describe the environmental forcing factors, such as imposed by the excitation array 112 (either in very precise detail with several moments in pressure and temperature—or by virtue of some simplifications, such as merely specifying a dominant wavelength, period and amplitude of a pressure wave in air at a given constant ambient temperature that matches the blades' temperature). The values for such parameters are known or can be assumed known; and, are represented by the environmental parameters values 312 in FIG. 3.

There are other parameters that describe the vibrational properties of the components of the IBR itself, so called structural properties, such as Young's modulus or resonant frequencies or modal distances, that are considered not to depend on the environmental factors. These parameters are called herein "inherent vibratory properties" parameters. Their values can also be estimated and are represented by the inherent vibratory properties parameters values 314 in FIG. 3. While some such parameters refer to the IBR as a whole, a subset of these parameters can be considered to refer to a single blade section (the single blade airfoil and its fixed points at the inner or outer radius of the disk, or both) of the IBR. This subset is called inherent blade section vibratory property parameters, and the values for this subset of parameters is depicted in FIG. 3 as inherent blade section vibratory property parameter values 315.

When these values 312 and 314 are input to the model 310, the result is a simulated measurable value, represented as simulated measurements 318 in FIG. 3, such as mistuning percent per blade as depicted in FIG. 2C for the FMM. If the simulated measurements 318 are different enough to be of concern from actual measurements for a tested IBR, the latter represented by actual measurements 320 in FIG. 3, then the values of one or more inherent vibratory properties parameters 314 can be adjusted to provide better agreement. This can be done using any of a variety of model fitting techniques, such as maximum likelihood or minimum error or entropy, represented by adjustment module 330. The adjusted values replace the initial values as the inherent vibratory properties parameters values 314. The process can be repeated until the difference between simulated measurements 318 and actual measurements 320 is acceptable. The final adjusted values 314 are considered to characterize the IBR; and, can be used with other values of the environmental parameters 312 to predict the performance of that particular tested IBR under such different operating conditions.

Figure 4A:
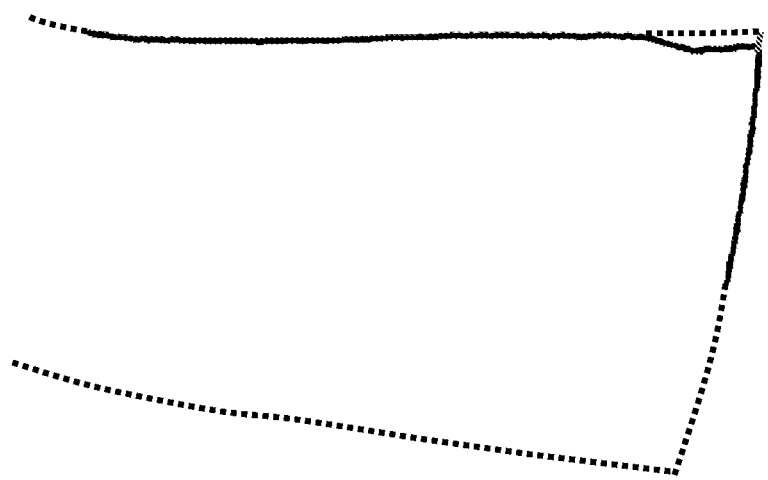
FIG. 4A and FIG. 4B are diagrams that illustrate example measured shape values for a blade of an IBR, according to an embodiment.
Figure 4B:
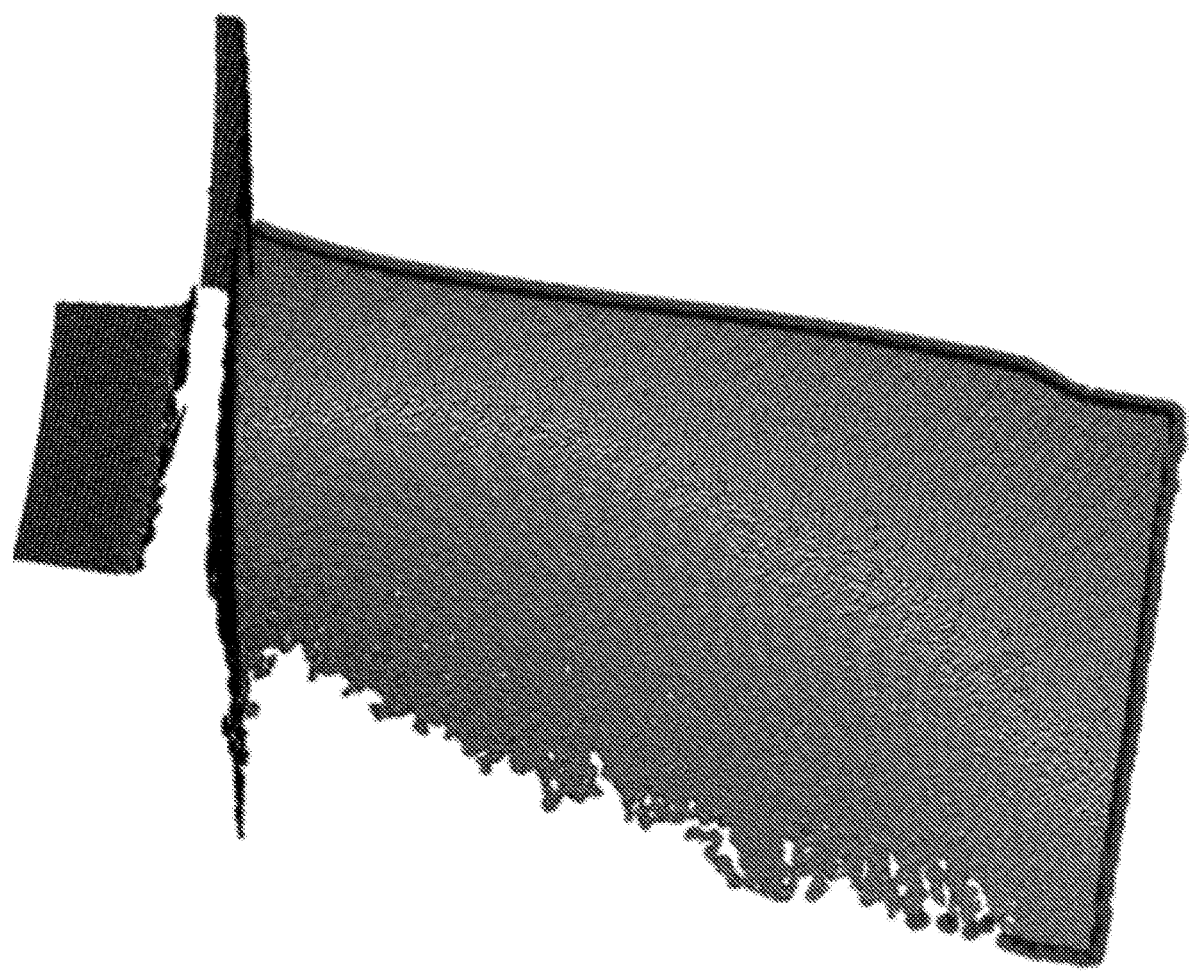

FIG. 4A and FIG. 4B are diagrams that illustrate example measured shape values for a blade of an IBR, according to an embodiment. FIG. 4A depicts a measured blade edge profile (solid line) compared to a designed edge (dotted line). Such a profile can be provided by an optical scanner included among vibration sensors 114, as described above. The difference can lead to a change in the value of one or more inherent vibratory properties parameters that can result in increased mistuning, for example. However, the information provided by this profile is limited. FIG. 4B depicts a measured top surface of one blade obtained, for example by the separate optical scanner 120. There is a great deal more information here that can be used to determine whether and how to repair, e.g., whether to blend and, if so, where and how much. According to an embodiment, shape measurements (also called geometric measurements) involving either the edge of FIG. 4A or the surface of FIG. 4B, or some combination, is used in the following method.

Figure 5:
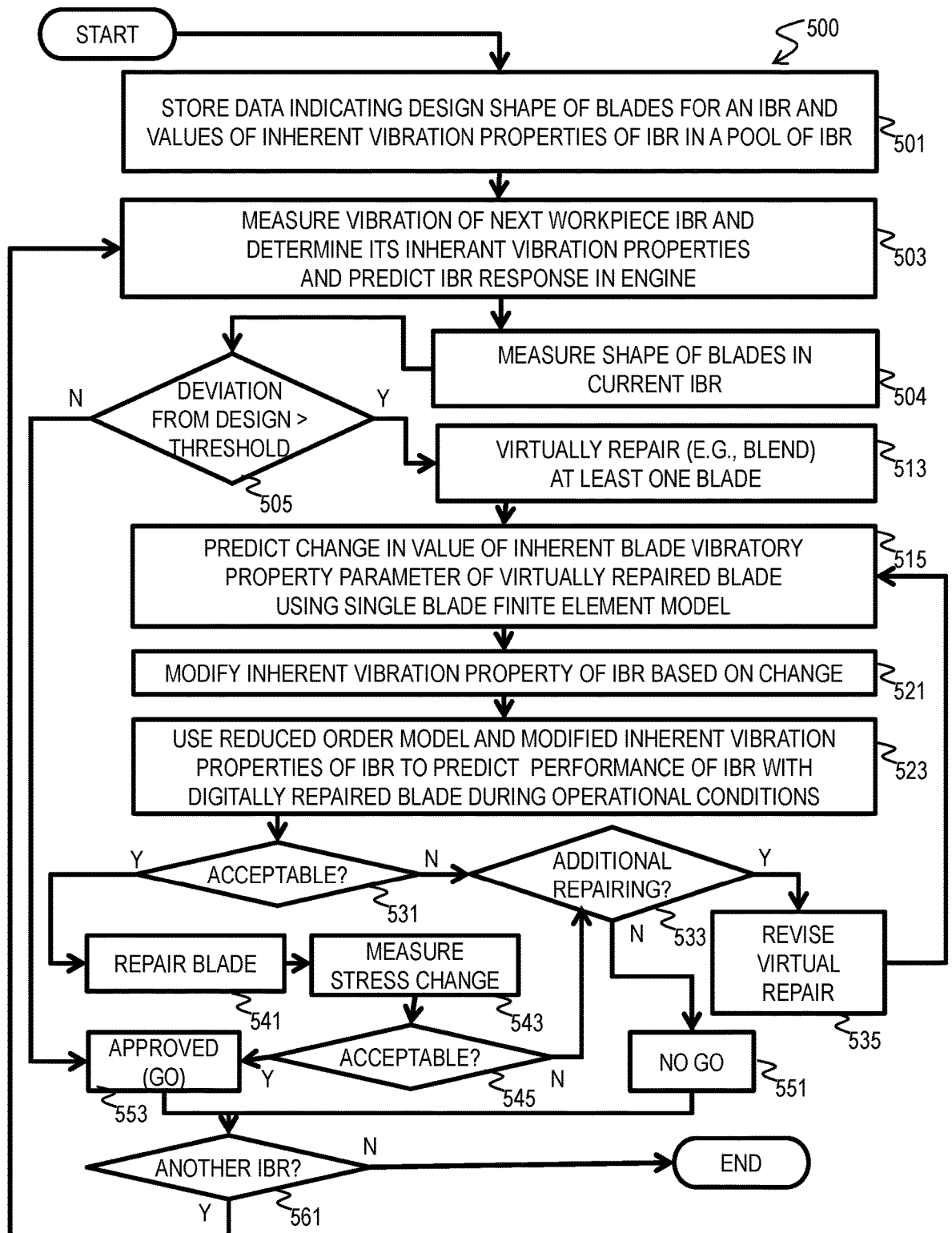
FIG. 5 is a flow diagram that illustrates an example method for maintaining an IBR, according to an embodiment.

FIG. 5 is a flow diagram that illustrates an example method 500 for maintaining an IBR, according to an embodiment. Although steps are depicted in FIG. 5 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways. At least some of these steps are performed automatically by automated maintenance module 162.

In step 501, historical data is stored on a computer-readable medium, e.g., in automated maintenance database 164, on a local or remote host. The historical data indicates, for each of one or more IBR types, configuration of IBR components, design shapes for blades, inherent vibratory properties parameters based on a reduced order model (such as the FMM), and values for those parameters for one or more IBR from a pool of one or more IBR that inform the maintenance system 100.

In step 503, a workpiece IBR 190 is inserted into recess 111 of IBR vibration testing equipment 110 and, based in whole or in part on instructions of the automated maintenance module 162, is subjected to excitation by operating the excitation array 112 based on an experimental set of values for the environmental parameters. The resulting actual vibration measurements, e.g., as depicted in FIG. 2A or FIG. 2B or mistuning data depicted in FIG. 2C, are received by automated maintenance module 162 and are stored, e.g., in automated maintenance database 164. Step 503 includes running the reduced order model in the process depicted in FIG. 3 to adjust any inherent vibratory property parameter values as desired to produce simulated measurements that match the actual vibration measurements using one or more matching criteria. Thus step 503 includes operating the IBR vibration testing apparatus (e.g., equipment 110) to accumulate first vibration data of a first IBR to be tested and determining a set of values for a corresponding set of inherent vibratory properties of the first IBR based on the vibration data and a reduced order model for an IBR type to which the first IBR belongs. In some embodiments, step 503 includes predicting the performance of the workpiece IBR under engine operating conditions based on the inherent vibratory parameters values so determined.

In step 504, the shape of one or more blades on the workpiece IBR are measured. In some embodiments, step 504 includes determining which one or more blades are to have their shape measured. For example, the one or more blades measured are based on one or more blades determined manually or using artificial intelligence. In some embodiments, all blades are measured. In some embodiments, measuring the shape of a blade involves measuring only an edge of the blade, such as shown in FIG. 4A. In some embodiments, measuring the shape of a blade includes measuring all or a portion of a top surface or bottom surface of the blade, or both surfaces, such as shown in FIG. 4B for a top surface. Any means to measure the edge or surface of a blade may be used, such as the optical scanner 120 depicted in FIG. 1A. In some embodiments, the shape measurement device is operated manually by a human operator and data provided to automated maintenance module 162; and, in other embodiments, the shape measurement device is operated in whole or in part automatically, e.g., under the control of automated maintenance module 162. Thus step 504 includes operating the optical scanner to measure an initial shape of at least one surface of a first blade of the first IBR. Control passes to step 513.

In step 505, it is determined whether the observed shape or vibration data (or both) deviates from the designed shape or vibration (or both) by more than some corresponding tolerance threshold. Any shape or vibration tolerance threshold may be used, including: a subjective threshold determined by an operator based on plots presented at a graphical user interface; a manufacturers specification; a fleet operators specification; a distribution of shapes or vibrations observed in a fleet; or a maximum shape or vibration observed in a fleet without immediate or short term failure, among others, or a change of a given size in one or more values of the inherent vibratory properties parameters such as a change in frequency of a particular node or blade frequency ratio of a particular blade, or some combination. The threshold can be expressed in any manner, including a Goodman relation for the stresses associated with a vibration tolerance. In some embodiments, step 505 includes a test (not shown) for an excessive deviation in vibration or shape that is not worth a repair. If the deviation is not worth a repair, control passes (not shown) to step 551 to indicate a "no go" state, as described in more detail below.

If there is no measurable deviation, or if the deviation is less than the tolerance threshold, then control passes to step 553. In step 553 a result is presented that indicates the IBR may be used in the fleet or facilities. This finding is called a "go" condition for the workpiece IBR. The presentation can be made in any fashion, collectively called a display device, e.g., in a message displayed on a monitor, a message sent to a remote host or piece of equipment that causes that remote host or piece of equipment to do something or not do something, such as display on a monitor or graphical user interface (GUI) with which a human operator interacts, or a message sent to the transfer mechanism 130 causing it to move the workpiece to a container for use in repair or replacement in a fleet vehicle or facility or otherwise prevent discarding the workpiece. Control then passes to step 561 to determine if there is a next workpiece IBR to maintain. If not, the process ends. If so, control passes back to step 503, described above.

If there is a measurable deviation from designed value and the deviation is greater than the tolerance threshold, but not greater than a threshold for not worthy of repair, then control passes to step 513. In various embodiments, a measured deviation equal to the threshold passes control to either step 553, as described above, or to step 513.

In step 513, data indicating a repair (e.g., material, if any, to blend) on a blade is determined to produce a restored shape to the blade. In some embodiments, the restored shape is closer to a design shape for the blade than is an initial, marred shape of the blade. Step 513 includes identifying a marred blade that is desirably repaired, and a portion of an edge or surface to repair on that marred blade. One type of repair is blending that moves material from a space where it is unwanted. For example, during step 513 geometry is identified of at least some excess material to trim (blend) from at least one blade. Any method may be used to identify the marred blade and at least the excess geometry to trim in the portion to blend, including manually identifying the excess geometry by a human operator using a GUI, and automatically finding one or more of the biggest deviations from the design blade shape automatically with an algorithm, such as based on instructions for the automated maintenance module 162, or some combination. Step 513 includes determining data that indicates a shape of the marred blade after repair, e.g., determining data that represents a restored shape of the blade after trimming excess material. This determination is called virtually repairing the at least one blade in FIG. 5. Note that step 513 does not physically change any blade, but merely indicates a virtual new restored shape that can be achieved by possible later physical repair such as blending.

In some embodiments, the virtually repaired blade more closely matches a design shape for the blade. However, some trimming can be excessive and leave the blade with unfilled spaces that weaken the blade to the extent that the blade will fail after an undesirably short lifetime or otherwise confound the determination of usefulness of the blade or the IBR. Thus, in some embodiments, the virtual trimming is selected from a predetermined limited set of repairs specified for blades of the same IBR type. These pre-approved repairs, including pre-approved blends, may be obtained from a manufacturer or a fleet/facility maintenance authority or some other authority, or may be deduced from historical data. In some embodiments, pre-approved repairs beyond blending are called repair coupons and include material addition, such as welding, remolding such as under near-melting conditions, and blade replacement. Thus step 513 includes obtaining repair data that indicates a candidate repair to form a virtually restored shape of the at least one surface of the first blade. Often, the restored shape is closer to a design shape and different from the initial shape. In addition, in some embodiments, step 513 includes determining blend data that indicates pre-approved blends; or one or more blending operations manually input through a graphical user interface (GUI) by an operator; or some combination.

In some embodiments, the virtually repaired blade is associated in step 513 with a jig that is used for blending in the repair apparatus 140 to control the depth of grinding by grinder 144 with radial distance along the blade. In various embodiments, the jig can be a physical jig 145 that can be fabricated or selected from prefabricated jigs and inserted into the blending apparatus, as depicted in FIG. 1A, or the jig can be a virtual jig that is data that indicates grinding depth as a function of radial distance, e.g., used in an automatically controlled blending apparatus, such as a grinding apparatus controlled by automated maintenance module 162. Thus, in some embodiments, step 513 includes blend data that indicates a shape of a jig for a blending apparatus.

In step 515, a finite element model (FEM) or other higher order model for a single blade and its disk sector is used to determine a change in a value of an inherent blade section vibratory property parameter for the virtually restored blade. While a FEM is computationally excessive for modeling the whole IBR, it is much more efficient when used to predict the vibrations of a single blade and disk sector. During step 515, the FEM (or other higher order model) for the virtually repaired blade(s) with their material shapes and elastic properties of the constituent materials is driven by the environmental parameter values 314 used during step 503 to predict the vibrations of the virtually trimmed blade(s), including one or more mode families for the virtually trimmed blade(s). This data is used to estimate a change between an initial and a virtually repaired blade. For example, for each blade virtually trimmed, the frequency of the peak vibration is determined based on a FEM for both the initial and virtually trimmed blade and its disk sector; and, this change, designated $\Delta f$, is determined during step 515.

In step 521, the values 314 of the inherent vibratory properties parameters of the IBR with the virtually repaired blade(s) are adjusted based on the changes determined in step 515. For example, the blade frequency ratio for the virtually trimmed blade is changed from the value determined during step 503 based on $\Delta f$ determined in step 515. This provides a credible first estimate of the effect of the virtual trimming on the inherent vibratory properties of the IBR even before any blending is actually done. Thus, step 521 determines a change in a value of an inherent blade section vibratory property of the set of inherent vibratory properties of the first IBR based on the restored shape.

In step 523, it is determined how the IBR with the virtually repaired blades would perform under one or more operational conditions. Step 523 includes using the reduced order model and the adjusted values for one or more inherent vibratory properties parameters of the IBR with a range of operational values for the environmental parameters, to determine the output of the reduced order model (such as mistuning from the FMM) for that range of operational environments. Thus step 523 includes determining predicted performance of the first IBR based at least in part on the change in the value of the inherent blade section vibratory property and the reduced order model for the IBR type.

In step 531 it is determined whether the performance is acceptable for that range of environments. Any method may be used to determine if the performance is acceptable. For example, if the greatest vibrations for the range of environments is less than a threshold value, then the performance is acceptable. As another example, if a certain percentile (e.g., 90% or 80% or 50%) of the vibrations are less than the threshold value, then the performance is acceptable.

In some embodiments, blending options considered in steps 513 and 533 above may be limited in practice because the frequency changes are deemed too large, or the frequency changes from the blends changes the system dynamics so that some of the blades act as tuned absorbers, or because the blends cause a change in the mode shape of the blended blade, or because it causes neighboring modes to interact.

In some embodiments, a mistuning amplification factor (MAF) is determined. The MAF is defined as the maximum peak amplitude of the highest responding blade on the IBR divided by the average of the maximum peak amplitudes of all blades on the IBR. When measuring MAFs it is important that the FRFs are measured at consistent locations on the blades, e.g. the tip of the leading-edge of each airfoil. For example, if an IBR has a MAF of 2, then there is a blade on the IBR that has a peak amplitude twice as large as the average. A large MAF is dangerous, since it indicates that the vibration energy is isolated in only a few blades that act as tuned absorbers and that are more likely to fail from high cycle fatigue. Consequently, one embodiment is to not accept a blend if it causes the MAF to exceed a specified limit. If the repair is rejected, then it would be possible to use a validated FMM model to determine how to change the frequencies of the blades to lower the IBR's MAF. These frequency changes could be implemented by additional blending and then retested to document that it has an acceptable value of MAF.

In some embodiments, a limit may be imposed on the change in the mode shape of the blended blade. In this context, mode shape means the distribution of displacements and stresses within the blade. One way to quantify the change in mode shape is to measure the FRFs at a grid on points on the blended blade and use modal identification software to extract its mode shape from its response at resonant peaks. Then, the mode shape of the blended blade can be compared with the mode shape of undamaged blades using modal assurance criteria MAC as a metric. MAC values go from 0% to 100%, with 100% indicating a perfect match. Consequently, the blend would be acceptable if the MAC is greater than a prescribed limit.

However, limiting the MAC value could be unnecessarily conservative since the real issue is not whether the mode shape changes but whether the change in mode shape causes higher vibratory stress. In another embodiment, the mode shape information from the blended blade is processed to estimate stress. For example, the modal displacements used to determine MAC could be used to calculate curvature. Since the edges of the airfoils are similar to beams, curvature could be used with beam theory to estimate the tangential component of stress along the edges of the blade including around the blend. As a result, the experimentally determined vibratory stresses along the edges of the blended blade can be compared with the vibratory stresses in the undamaged blades to determine a dynamic stress amplification factor, DSAF. DSAF is the ratio of the maximum vibratory stress in the blended blade divided by the maximum of the vibratory stresses in the undamaged blades over the frequency range of interest. The blend is then acceptable if the DSAF is less than some limit.

In various embodiments of step 531, the frequency change, MAC, MAF or DSAF, or some combination, is computed for the IBR with the virtually repaired blades. In any of these embodiments, if the largest frequency change, MAC, MAF or DSAF, or some combination, for the range of environments, meets the threshold criteria, then the performance is acceptable. Thus, step 531 includes determining a condition of the first IBR based at least in part on the change in the value of the inherent blade section vibratory property. In some embodiments, step 531 more specifically includes determining the condition based at least in part on the predicted performance.

If it is determined in step 531 that the IBR with virtually repaired blade(s) is acceptable, then control passes to step 541. In step 541, the workpiece IBR is transferred to the recess 141 in the repair apparatus 140; and, the virtual repair determined during the most recent occurrence of step 513 is actually performed using the manually or automatically controlled repair apparatus 140 and the candidate repair data, including any jig for blending. Control then passes to step 543.

In step 543, the actual vibrations of the repaired IBR are measured. Even with one set of values for the environmental parameters, this step serves to verify the reduced order model and higher order model and the parameter values used during steps 515, 521 and 523. If the measured values match the predicted values within a tolerance, then no changes are made to the models' parameter values. Otherwise, one or more model parameter values are changed for either the higher order model or the reduced order model or both during step 543. In some embodiments, step 543 includes measuring MAF or DSAF, or some combination for the physically repaired IBR. In some embodiments in which the values of the model parameters are not consistent with those determined in steps 515, 521 or 523, the measurements are repeated for a range of operational conditions; or performance is computed virtually using a range of values 312 of the environmental parameters and the revised values of the inherent vibratory property parameters 314, or some combination. Thus step 531 or step 543 or both include determining a dynamic stress amplification factor based at least in part on the first vibration data.

In step 545 it is determined whether the measured performance, or simulated performance, or some combination, is acceptable. For example, MAF or DSAF for the range of operational environments is compared to appropriate threshold values; and, each is acceptable if less than or equal to the threshold values. Thus step 545 or step 531 or both determine the condition based at least in part on the dynamic stress amplification factor. If acceptable, then control passes to step 553, described above, which indicates the workpiece IBR is approved for use in the fleet or facilities. That is, the workpiece IBR is in "go" condition.

If it is determined in step 531 that the virtually repaired IBR does not have acceptable performance, or if it is determined in step 545 that the physically repaired IBR does not have acceptable performance, then control passes to step 533. In step 533, it is determined whether additional repair is available. For example, it is determined if another blend with more severe blending is available, or that additional or substitute repairs that include moving material into spaces with insufficient material is available. If so, then control passes to step 535.

In step 535, a revised virtual repair is performed on one or more blades of the workpiece IBR based on one of the additional repair options still available. Control then passes back to step 515 and following steps, as described above, to determine the effects of the revised virtual repair.

If it is determined in step 533 that no additional repair is available, then control passes to step 551. In step 551 a result is presented that indicates the IBR may NOT be used in the fleet or facilities. This finding is called a "no go" condition for the workpiece IBR. The presentation can be made in any fashion, collectively called a display device, e.g., in a message displayed on a monitor, a message sent to a remote host or piece of equipment that causes that remote host or piece of equipment to do something or not do something, such as display on a monitor or graphical user interface (GUI) with which a human operator interacts, or a message sent to the transfer mechanism 130 causing it to move the workpiece to a container for recycling or discarding the workpiece. Control then passes to step 561 to test the next workpiece IBR. Thus step 551 for a "no go" condition and step 553 for a "go" condition present the condition on the display device.

The method 500 using a system 100, or a subset of both, thus provides for automated maintenance (e.g., monitoring or repairing or both) of an IBR based on measurements of the surface of the IBR and reduced order modeling, e.g., within a fleet of vehicles using turbine engines, or within a set of one or more facilities using turbine generators.

2. Example Embodiments

Figure 6:
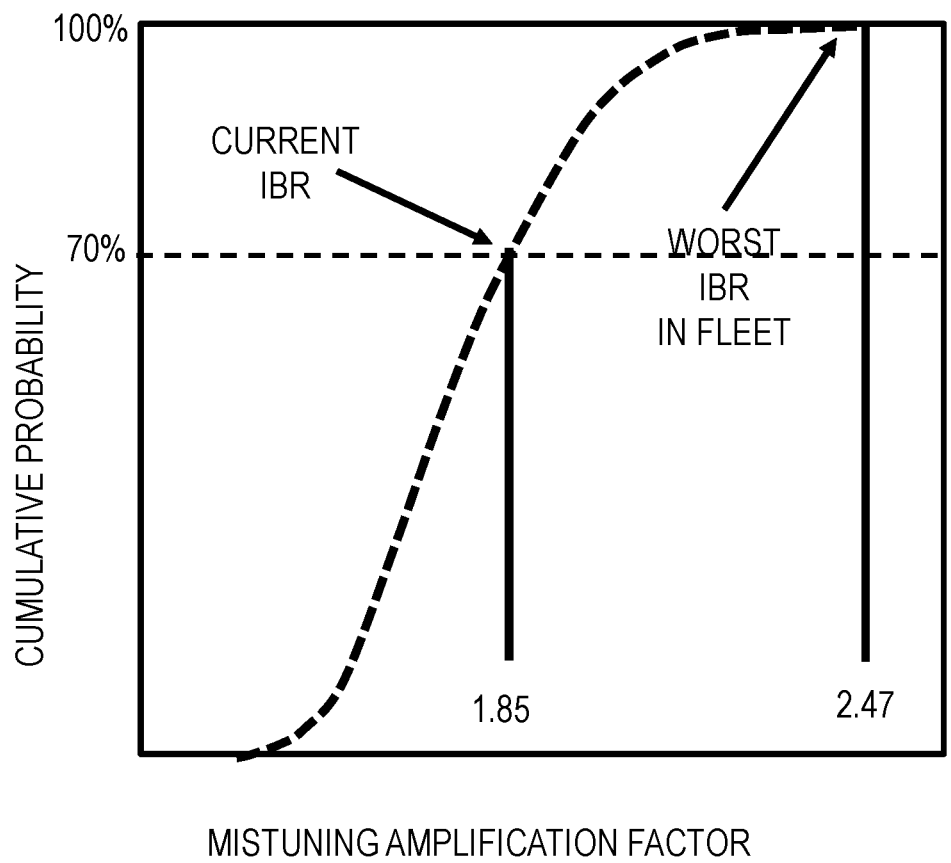
FIG. 6 is a plot that illustrates example conditions associated with a population of IBRs, according to an embodiment.

In some embodiments, the mistuning amplification factor (MAF) for the repaired IBR is determined and compared with a limit. The designated limit may be established through historical data, experience, or analyses. FIG. 6 provides an example of an embodiment of this concept that uses historical data. In FIG. 6, cumulative probability is plotted as a function of MAF. For example, this data could be acquired if the IBRs were vibration tested during the manufacturing process so that the historical data includes hundreds of MAF values of IBRs with undamaged and unrepaired blades. In addition, suppose that none of these IBRs failed from excessive vibration in the engine. Then the measured MAF values should reflect a range of values that can be safely used in the engine. Then the historical values of MAF can be ranked and a probability assigned based on what fraction of newly manufactured IBRs have MAF values below a particular value. For example, in FIG. 6, the dotted curve represents the cumulative probability that a newly manufactured IBR has an MAF value above a specific value. In FIG. 6, the highest MAF value of new IBRs is 2.47 and the MAF of the IBR with a repair, labelled CURRENT IBR, has a value of 1.85. The MAF limit, based on historical data, could then be based on the requirement that some percent of newly manufactured IBRs, e.g. 10%, have MAF values greater than the current IBR. If this were the case, then the CURRENT IBR would pass since its amplitude is at the 70-percentile level which means that 30% of newly manufactured IBRs had larger MAFs.

Figure 7:
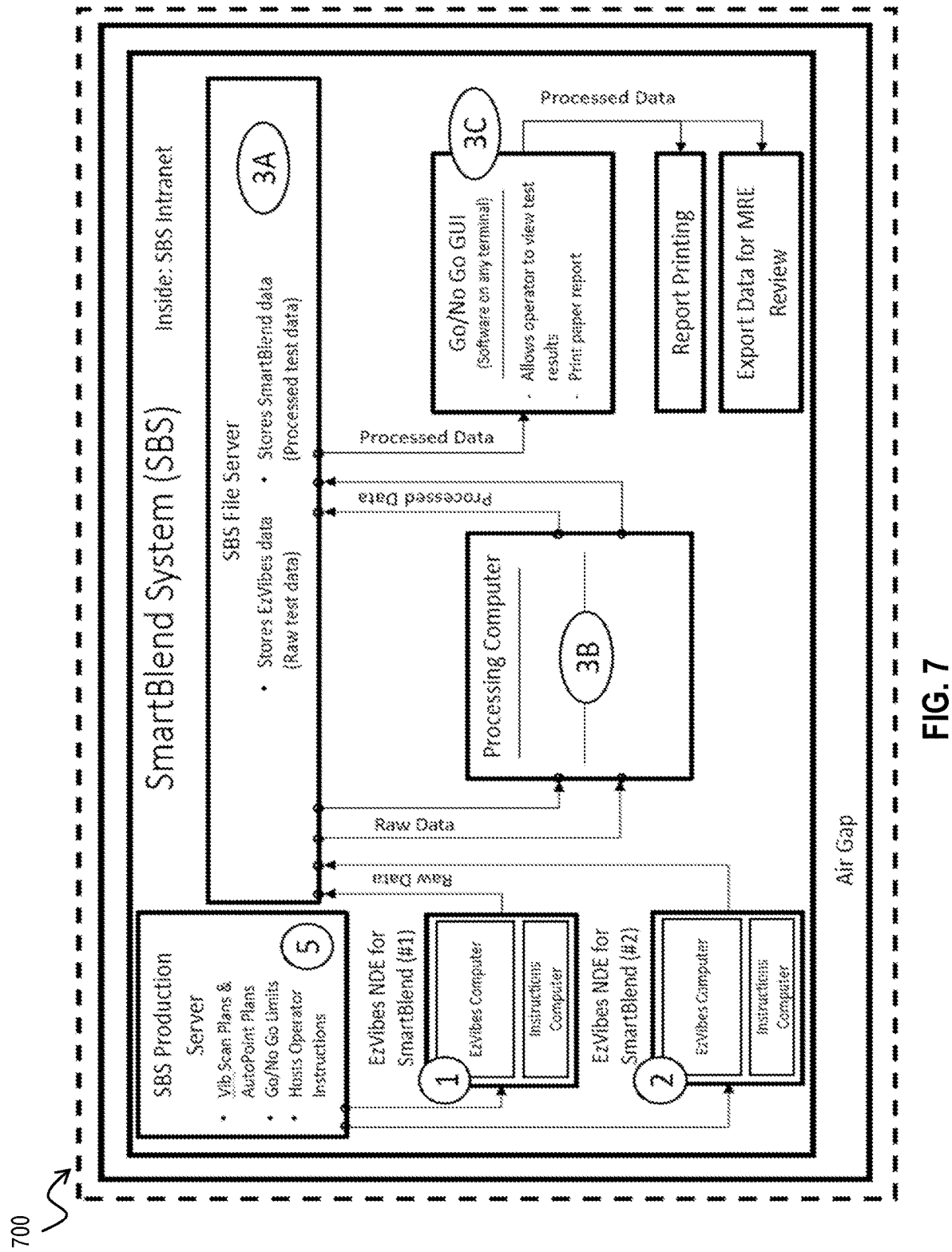
FIG. 7 is a block diagram that illustrates a particular example system, according to an embodiment.

FIG. 7 is a block diagram that illustrates a particular example system called the SmartBlend® system (SBS) 700, available from Blade Diagnostics Corporation of Pittsburgh Pennsylvania, according to an embodiment. An EzVibes NDE (Non-Destructive Evaluation) 1, available from Blade Diagnostics Corporation of Pittsburgh Pennsylvania, is used as IBR vibration testing equipment 110 and optical scanner 120. As such, EzVibes NDE 1 is the data acquisition portion of this example SBS 700. EzVibes NDE 1 excites a workpiece IBR so that the IBR vibrates; and, EzVibes NDE 1 measures the vibratory response as well as the geometry of the IBR. A second EzVibes NDE 2 shows that a SBS 700 can have multiple EzVibes NDE machines.

In this example, all of the input data that is specific to repairing a particular type of IBR resides on a "Production Server" 5, performing as computer controller 150. For example, the input data may reside in an automated maintenance database 164 and include vibration scan plans, nominal geometry information, operator instruction and various limits that are desirably satisfied by the repair. It is beneficial, but not essential, to have the instructions for all EzVibes systems come from a single source so that they can be easily updated. SBS File Server 3A also serves as host for the automated maintenance database 164 and stores: raw test data (EdgeScan and vibration) and processed test data results (modal information, Go/NoGo results, etc.).

Processing Computer(s) 3B hosts automated maintenance module 162 and is primarily configured to perform numerical calculations at high speed. In various embodiments, the system may have a single (or multiple) Processing Computers as desired. For example, one of the computers could be used to run proprietary algorithms, such as those used to extract inherent vibratory properties parameter values, and a second computer could be used to host 3rd party proprietary processes and information to ensure that each party's proprietary information is not commingled and thus remains secured. The Processing Computer(s) could then scan the SBS server for new data files and automatically run the appropriate analyses to establish Go/NoGo. The results could then be stored within the SBS 700, for example on the SBS file server 3A.

In some embodiments, a separate computer provides a Graphical User Interface (GUI) 3C. For example, the GUI could be used for conveniently viewing data, printing reports, or transferring data to an approved device.

In some embodiments, for added security, the SBS interfaces with an "Air Gap" between the SBS 700 and a customer's computer network. In the illustrated embodiment, the SBS 700 is configured as a stand-alone system that forms its own local area network and is not physically connected to the customer's computer system. Thus, data to be exchanged with the customer is transferred manually. However, for improved efficiency, the SBS 700 could also be directed connected to a customer's information technology (IT) network, for example to transfer data from the SBS 700 to the customers network or to an automated maintenance station, using any desirable security measures, such as a virtual private network (VPN) connection or other forms of encryption.

The vibration data from the SBS 700 can be used to determine mistuning amplification factors (MAFs) or dynamic stress amplification factors (DSAFs) for each blade when an IBR is excited by an engine-type excitation. The SBS 700 is also used to evaluate the vibratory response of IBRs that have blended blades. An issue is that a larger blend causes the mode shape of the blade to change. As a result, using the SBS 700 to determine the DSAF of an IBR with blended blades provides a more robust assessment of the IBR's vibratory state and could, potentially, allow larger blends to be used to repair more IBRs.

3. Computational Hardware Overview

Figure 8:
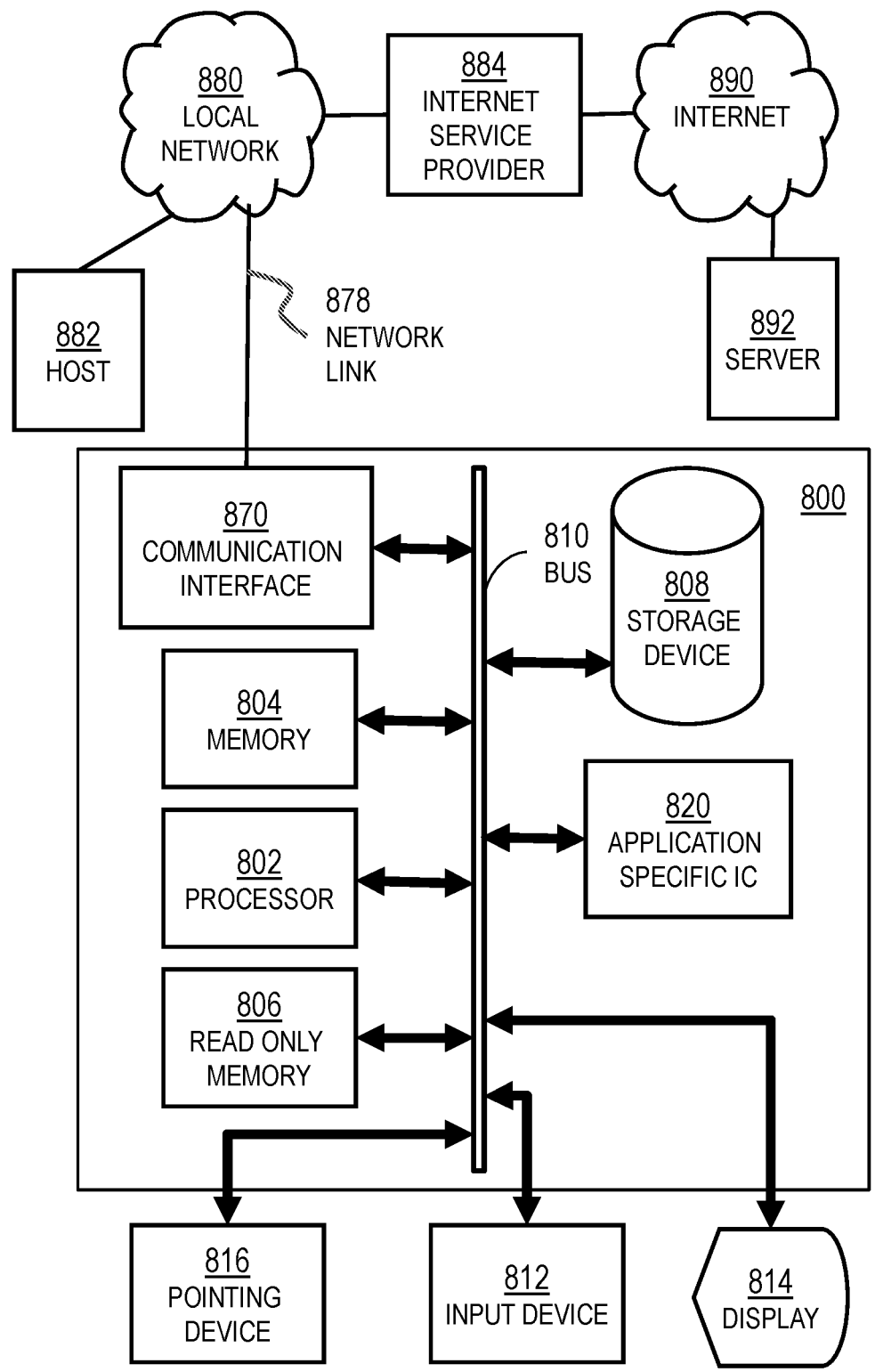
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit)). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein.

A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitutes computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk or optical disk, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into signals compatible with the signals used to represent information in computer system 800. Other external devices coupled to bus 810, used primarily for interacting with humans, include a display device 814, such as a cathode ray tube (CRT) or a liquid crystal display (LCD), for presenting images, and a pointing device 816, such as a mouse or a trackball or cursor direction keys, for controlling a position of a small cursor image presented on the display 814 and issuing commands associated with graphical elements presented on the display 814.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 870 sends and receives electrical, acoustic or electromagnetic signals, including infrared and optical signals that carry information streams, such as digital data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 802, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 802, except for carrier waves and other signals.

Logic encoded in one or more tangible media includes one or both of processor instructions on a computer-readable storage media and special purpose hardware, such as ASIC 820.

Network link 878 typically provides information communication through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides information representing video data for presentation at display 814.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820, may be used in place of or in combination with software to implement the invention. Thus, embodiments of the invention are not limited to any specific combination of hardware and software.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in storage device 808 or other non-volatile storage for later execution, or both. In this manner, computer system 800 may obtain application program code in the form of a signal on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red a carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
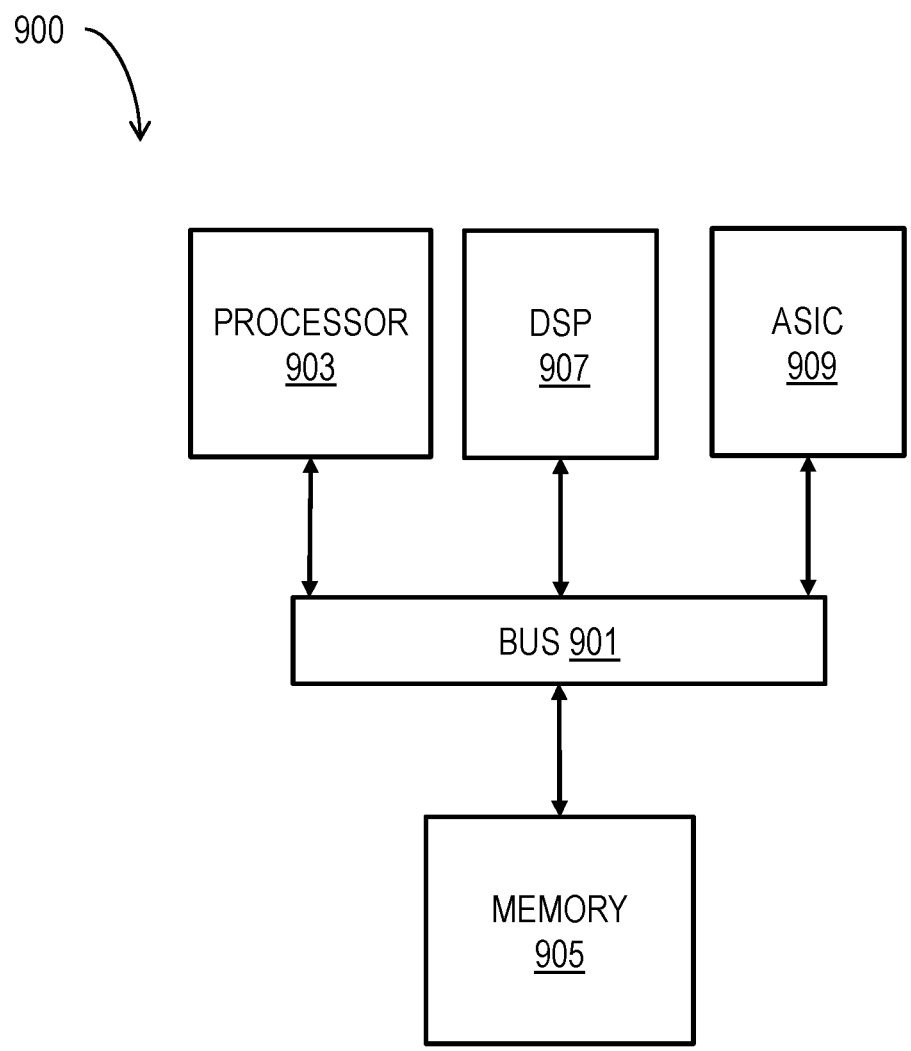
FIG. 9 illustrates a chip set upon which an embodiment of the invention may be implemented.

FIG. 9 illustrates a chip set 900 upon which an embodiment of the invention may be implemented. Chip set 900 is programmed to perform one or more steps of a method described herein and includes, for instance, processor and memory components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of a method described herein.

Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein. A sequence of binary digits constitutes digital data that is used to represent a number or code for a character.

A processor 903 performs a set of operations on information. The set of operations include bringing information in from a bus 901 and placing information on the bus 901. The set of operations also typically include comparing two or more units of information, shifting positions of units of information, and combining two or more units of information, such as by addition or multiplication. A sequence of operations to be executed by the processor 905 constitute computer instructions.

The memory 905, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 905 is also used by the processor 903 to store temporary values during execution of computer instructions.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively, or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 905 also stores the data associated with or generated by the execution of one or more steps of the methods described herein.

4. Alterations, Deviations, Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items. elements or steps. Furthermore, the indefinite article "a" or "an" is meant to indicate one or more of the item, element or step modified by the article.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

5. References

[1] Feiner, D., and Griffin, J. H., 2002, "A Fundamental Model of Mistuning Using a Subset of Nominal System Modes," ASME J. Turbomach., 124(4), pp. 597-605.
[2] Castanier, M., Ottarsson, G., and Pierre, C., 1997, "A Reduced Order Modeling Technique for Mistuned Bladed Disks," ASME J. Vib. Acoust, 119(3), pp. 439-447.
[3] Yang, M.-T., and Griffin, J. H., 2001, "A Reduced Order Model of Mistuning Using a Subset of Nominal Modes," ASME J. Eng. Gas Turbines Power, 123(4), pp. 893-900.

What is claimed is:
1. A system for maintaining integrally bladed rotors (IBR), the system comprising:
a IBR vibration testing apparatus;
an optical scanner;
a display device;
at least one processor; and
at least one memory including one or more sequences of instructions, the at least one memory and the one or more sequences of instructions configured to, with the at least one processor, cause the system to perform at least the following,
operate the IBR vibration apparatus to accumulate first vibration data of a first IBR to be tested and determining a set of values for a corresponding set of inherent vibratory properties of the first IBR based on the vibration data and a reduced order model for an IBR type to which the first IBR belongs;
operate the optical scanner to measure an initial shape of at least one surface or edge of a first blade of the first IBR;
obtain repair data that indicates a candidate repair to form a restored shape of the at least one surface of the first blade;
predict a change in a value of an inherent blade section vibratory property of the set of inherent vibratory properties of the first IBR based on the restored shape and a single blade finite element model (FEM);
determine an adjusted input for the reduced order model based on the change in the value of the inherent blade section vibratory property;

determine a condition of the first IBR based at least in part on the adjusted input for the reduced order model input to the reduced order model; and present the condition on the display device.

2. The system as recited in claim 1, wherein the optical scanner is included in a vibratory sensor in the IBR vibration testing apparatus and the optical scanner measures at least one edge of the first blade.

3. The system as recited in claim 1, wherein the optical scanner is different from a vibratory sensor in the IBR vibration testing apparatus and the optical scanner measures at least one surface of the first blade.

4. The system as recited in claim 1, wherein the repair data indicates a shape of a jig for a blending apparatus.

5. The system as recited in claim 1, wherein the adjusted input is blade frequency ratio.

6. The system as recited in claim 1, wherein the reduced order model is a Fundamental Mistuning Model (FMM).

7. The system as recited in claim 1, wherein the one or more sequences of instructions are further configured to, with the at least one processor, cause the system to determine predicted performance of the first IBR based at least in part on the change in the value of the inherent blade section vibratory property and the reduced order model for the IBR type; and said step to determine the condition based at least in part on the adjusted input for the reduced order model input to the reduced order model further comprising determine the condition based at least in part on the predicted performance.

8. The system as recited in claim 1, wherein the one or more sequences of instructions are further configured to, with the at least one processor, cause the system to determine a dynamic stress amplification factor based at least in part on the first vibration data; and said step to determine the condition based at least in part on the adjusted input for the reduced order model input to the reduced order model further comprising determine the condition based at least in part on the dynamic stress amplification factor.

9. The system as recited in claim 1, further comprising a blending apparatus configured to blend the first blade based on the candidate repair associated with an approved repair value for the condition.

10. The system as recited in claim 9, wherein the repair data indicates a shape of a jig for the blending apparatus and the at least one memory and the one or more sequences of instructions are further configured to cause the system to operate the blending apparatus to use the jig to form automatically the restored shape of the at least one surface of the first blade.

11. The system as recited in claim 1, wherein the repair data indicates:

one or more coupons for predetermined repairs;

or one or more pre-approved blends;

or one or more blending operations manually input through a graphical user interface by an operator;

or some combination.

12. The system as recited in claim 11, wherein: the candidate repair is a candidate blend that is not included in the one or more pre-approved blends; the candidate blend is more severe than at least one pre-approved blend; and, the condition indicates approval to perform the candidate blend.

13. A method for maintaining integrally bladed rotors (IBR), the method comprising:

operating a IBR vibration apparatus to accumulate first vibration data of a first IBR to be tested and determining a set of values for a corresponding set of inherent vibratory properties of the first IBR based on the vibration data and a reduced order model for an IBR type to which the first IBR belongs;

operating an optical scanner to measure an initial shape of at least one surface or edge of a first blade of the first IBR;

obtaining repair data that indicates a candidate repair to form a restored shape of the at least one surface of the first blade;

determining automatically on a processor a change in a value of an inherent blade section vibratory property of the set of inherent vibratory properties of the first IBR based on the restored shape and a single blade finite element model (FEM);

determining an adjusted input for the reduced order model based on the change in the value of the inherent blade section vibratory property;

determining automatically on the processor a condition of the first IBR based at least in part on the adjusted input for the reduced order model input to the reduced order model; and presenting on a display device the condition.

14. The method as recited in claim 13, wherein the optical scanner is included in a vibratory sensor in the IBR vibration testing apparatus and the optical scanner measures at least one edge of the first blade.

15. The method as recited in claim 13, wherein the optical scanner is different from a vibratory sensor in the IBR vibration testing apparatus and the optical scanner measures at least one surface of the first blade.

16. The method as recited in claim 13, wherein the repair data indicates a shape of a jig for a blending apparatus.

17. The method as recited in claim 13, wherein the adjusted input is blade frequency ratio.

18. The method as recited in claim 13, wherein the reduce order model is a Fundamental Mistuning Model (FMM).

19. The method as recited in claim 13, wherein the method further comprises determining a predicted performance of the first IBR based at least in part on the change in the value of the inherent blade section vibratory property and the reduced order model for the IBR type; and said step of determining the condition based at least in part on the adjusted input for the reduced order model input to the reduced order model further comprises determining condition based at least in part on the predicted performance.

20. The method as recited in claim 13, wherein the method further comprises determining a dynamic stress amplification factor based at least in part on the first vibration data; and said step of determining the condition based at least in part on the adjusted input for the reduced order model input to the reduced order model further comprises determining the condition based at least in part on the dynamic stress amplification factor.

21. The method as recited in claim 13, further comprising operating a blending apparatus configured to blend the first blade based on the candidate repair associated with an approved blend value for the condition.

22. The method as recited in claim 21, wherein the repair data indicates a shape of a jig for the blending apparatus and the method further comprises automatically operating the blending apparatus to use the jig to form the restored shape of the at least one surface of the first blade.

23. The method as recited in claim 13, wherein the repair data indicates:
   one or more coupons for predetermined repairs; or,
   one or more pre-approved blends; or,
   one or more blending operations manually input through a graphical user interface by an operator; or,
   some combination.

24. The method as recited in claim 23, wherein: the candidate repair is a candidate blend that is not included in the one or more pre-approved blends; the candidate blend is more severe than at least one pre-approved blend; and, the condition indicates approval to perform the candidate blend.

* * * * *